United States Patent
Sharma et al.

(10) Patent No.: US 11,102,487 B2
(45) Date of Patent: Aug. 24, 2021

(54) IMAGE RESAMPLING FOR DCT BASED IMAGE ENCODING FORMATS USING MEMORY EFFICIENT TECHNIQUES

(71) Applicant: Adobe Inc., San Jose, CA (US)

(72) Inventors: Saumitra Sharma, Vasco Da Gama (IN); Sunil Kumar, Mathura (IN)

(73) Assignee: ADOBE INC., San Jose, CA (US)

( * ) Notice: Subject to any disclaimer, the term of this patent is extended or adjusted under 35 U.S.C. 154(b) by 103 days.

(21) Appl. No.: 16/556,744

(22) Filed: Aug. 30, 2019

(65) Prior Publication Data

US 2021/0067782 A1 Mar. 4, 2021

(51) Int. Cl.
*G06K 9/00* (2006.01)
*H04N 19/132* (2014.01)
(Continued)

(52) U.S. Cl.
CPC ......... *H04N 19/132* (2014.11); *H04N 19/119* (2014.11); *H04N 19/176* (2014.11);
(Continued)

(58) Field of Classification Search
CPC .. H04N 19/132; H04N 19/176; H04N 19/119; H04N 19/33; H04N 19/625; H04N 19/80; H04N 19/587; H04N 19/59; H04N 19/39; H04N 19/52; H04N 19/523; H04N 9/093; H04N 2201/3242; H04N 2201/3245; H04N 2201/325; H04N 2201/3274; H04N 2201/3273; H04N 2201/3278; H04N 5/262; H04N 1/58; H04N 1/32101; H04N 1/40068; H04N 1/387; H04N 1/3935; H04N 1/64; H04N 7/12; H04N 11/04; G06T 3/4007; G06T 3/403; G06T 3/4084; G06T 3/4092; G06T 3/40; G06T 3/4061; G06T 3/4076; G06T 7/12; G06T 7/13;
(Continued)

(56) References Cited

U.S. PATENT DOCUMENTS 6,681,056 B1 * 1/2004 Tseng ................. G06T 3/40
358/450
6,873,368 B1 * 3/2005 Yu .................. H04N 21/234363
348/385.1

(Continued)

OTHER PUBLICATIONS

S.A. Martucci, "Symmetric convolution and the discrete sine and cosine trans-forms," IEEE Trans. on Signal Processing, vol. 42, pp. 1038-1051, May 1994.
(Continued)

*Primary Examiner* — Jose L Couso
(74) *Attorney, Agent, or Firm* — Keller Jolley Preece

(57) ABSTRACT

The present disclosure relates to systems, methods, and non-transitory computer readable media for generating digital images of modified resolution by filtering in the frequency domain. For example, the disclosed systems can utilize a tiling procedure to generate discrete cosine transform blocks. The disclosed systems can further filter the quantized data of the discrete cosine transform blocks within the frequency domain using, for example, a Lanczos resampling kernel. In addition, the digital image resolution modification system can utilize sub-band approximation and block composition to generate a modified digital image.

20 Claims, 12 Drawing Sheets

(51) Int. Cl.
*H04N 19/33* (2014.01)
*H04N 19/119* (2014.01)
*H04N 19/80* (2014.01)
*H04N 19/176* (2014.01)
*H04N 19/625* (2014.01)

(52) U.S. Cl.
CPC ........... *H04N 19/33* (2014.11); *H04N 19/625* (2014.11); *H04N 19/80* (2014.11)

(58) Field of Classification Search
CPC . G06T 7/38; G06T 11/60; G06T 11/00; G06T 2207/20064; G06T 2207/10016; G06T 2207/10024; G06T 2207/20192; G06T 2207/20016; G06T 2207/20092; G06T 2207/20221; G06T 2200/16; G06T 2200/32; G06T 2200/24; G06T 5/00; G06T 15/00; G06K 9/32; G06K 9/6202; G06F 16/9577; G06F 16/583
See application file for complete search history.

(56) References Cited

U.S. PATENT DOCUMENTS

| | | | |
|---|---|---|---|
| 7,110,459 B2* | 9/2006 | Srinivasan | H04N 19/523 375/240.29 |
| 8,873,888 B2 | 10/2014 | Bose | |
| 2001/0055340 A1* | 12/2001 | Kim | G06T 3/4084 375/240.21 |
| 2002/0141499 A1* | 10/2002 | Goertzen | H04N 19/436 375/240.12 |
| 2002/0181592 A1* | 12/2002 | Gagarin | H04N 19/44 375/240.18 |
| 2004/0086188 A1* | 5/2004 | Owada | H04N 19/132 382/233 |
| 2004/0190023 A1* | 9/2004 | Aoyama | G06T 5/004 358/1.9 |
| 2006/0215764 A1* | 9/2006 | Malvar | H04N 19/39 375/240.18 |
| 2009/0067491 A1* | 3/2009 | Sun | H04N 19/587 375/240.03 |
| 2009/0252232 A1* | 10/2009 | Kishi | H04N 19/59 375/240.24 |
| 2018/0330474 A1* | 11/2018 | Mehta | G06T 3/4061 |
| 2019/0385288 A1* | 12/2019 | Stewart | G06T 5/002 |
| 2021/0027432 A1* | 1/2021 | Stewart | G06T 5/002 |

OTHER PUBLICATIONS

Jayanta Mukherjee and Sanjit K. Mitra in Image Filtering in the Compressed Domain, Lecture Notes in Computer Science, vol. 4338, 194-205.

J. Mukhopadhyay, "Image and video processing in the compressed domain", CRC Press, 2011.

J. Jiang and G. Feng. The spatial relationships of DCT coefficients between a block and its sub-blocks. IEEE Trans. on Signal Processing, 50(5):1160-1169, May 2002.

* cited by examiner

IMAGE RESAMPLING FOR DCT BASED IMAGE ENCODING FORMATS USING MEMORY EFFICIENT TECHNIQUES

BACKGROUND

With the explosion in quantity of, and uses for, digital images has come the need for efficient tools to manipulate digital images. Modifying the resolution of a digital image is a fundamental type of digital image manipulation. In particular, users or devices often need or desire different resolutions of the same digital image. For example, devices with different screen sizes can require different resolutions of the same image. Similarly, users may want a compressed version of an image for viewing on a mobile device and a larger resolution of the image for viewing or editing on a computer. Unfortunately, conventional digital image systems suffer from a number of disadvantages, particularly efficiency and flexibility, when modifying the resolution of digital images.

SUMMARY

One or more embodiments described herein provide benefits and solve one or more problems in the art with systems, methods, and non-transitory computer readable media that can efficiently modify the resolution of digital images in real time (or near real time) by filtering in the frequency domain. In particular, the disclosed systems can perform resampling of resource-intensive assets (e.g., discrete cosine transform images or video encodings) in real time by filtering in a frequency domain to reduce computations. Furthermore, one or more embodiments can modify the resolution of a digital image by resampling tiles or portions of the digital image rather than the entire digital image at once to reduce memory requirements. Thus, the disclosed systems can reduce the number of computations and the memory requirements required to modify the resolution of digital images.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
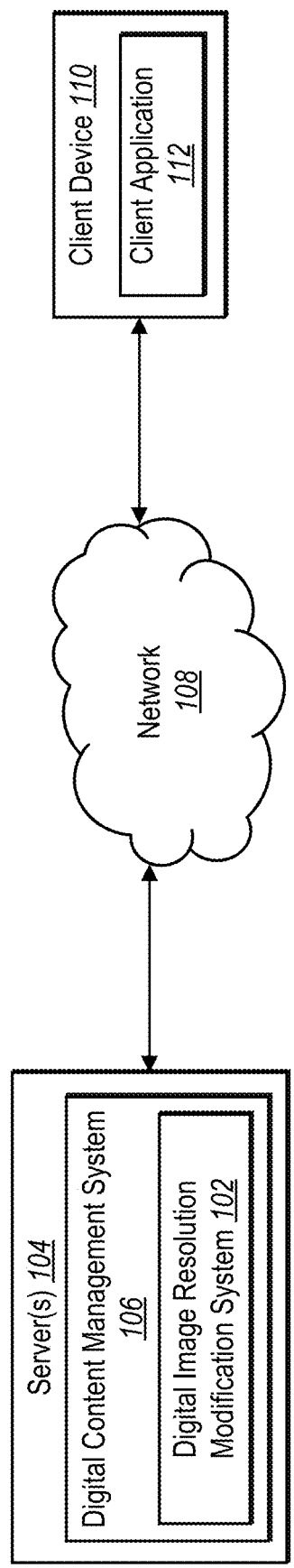
FIG. 1 illustrates an example environment for implementing a digital image resolution modification system in accordance with one or more embodiments.

One or more embodiments described herein include a digital image resolution modification system that can change the resolution of digital images by filtering in the frequency domain. Various applications, such as digital image viewing and editing applications, or devices with differing screen sizes, request or need different resolutions of a digital image. The digital image resolution modification system can generate a digital image of a different resolution from an initial digital image in real time or near real time rather than simply providing pre-generated versions of the digital image. To do so, the digital image resolution modification system can perform filtering of digital image in a frequency domain to reduce computations. Furthermore, the digital image resolution modification system can resample tiles or portions of the digital image rather than the entire digital image at once to reduce memory requirements. Thus, the digital image resolution modification system can reduce the number of computations and the memory requirements required to modify the resolution of digital images thereby allowing for on the fly modification of image resolution. As such, the digital image resolution modification system can provide a requested resolution of a digital image in real time without having to store pre-generated versions of the digital image.

As on overview, to modify the resolution of a digital image, the digital image resolution modification system can generate or otherwise access discrete cosine transform ("DCT") blocks of frequency data representing the digital image. The digital image resolution modification system can perform a resampling technique (e.g., Lanczos resampling) to filter the frequency data of the DCT blocks. The digital image resolution modification system can reduce the size of the resampled frequency data utilizing sub-band approximation to generate resized DCT blocks based on a target digital image resolution. To achieve a desired DCT block size for generating a modified digital image (e.g., as required for a particular digital image format such as JPEG), the digital image resolution modification system can merge DCT blocks utilizing a block composition matrix. The digital image resolution modification system can then generate the modified digital image by encoding the frequency data of the merged DCT blocks.

More specifically, in one or more embodiments, the digital image resolution modification system can encode the digital image from the spatial domain into the frequency domain to represent the digital image with frequency data (e.g., data that indicates frequencies of occurrence of color values or other encoded values within the digital image). For instance, in some embodiments, the digital image resolution modification system can encode the digital image into DCT blocks that include frequency data corresponding to tiled portions of the digital image. Indeed, a DCT block can include frequency data representing colors of a corresponding tiled portion of the digital image in the spatial domain. In some embodiments, the digital image resolution modification system can apply a transform (e.g., a DCT) to obtain frequency data relating to pixels of a digital image (e.g., when processing a raw digital image). In other embodiments, the digital image resolution modification system can utilize a Huffman decoding method to obtain the DCT blocks (e.g., when processing a compressed digital image). Additional detail regarding encoding the digital image into the frequency domain using DCT blocks is provided below with reference to FIG. 3.

In some embodiments, the digital image resolution modification system can filter the frequency data of the DCT blocks. To elaborate, the digital image resolution modification system can apply a resampling kernel (e.g., a filter window) to the DCT blocks as a sort of low-pass filtering process to remove high frequency data. For example, the digital image resolution modification system can utilize a Lanczos resampling technique (a type of geometrical downsampling) by applying a Lanczos resampling kernel to filter digital image data within the frequency domain. In some embodiments, the digital image resolution modification system can utilize a different resampling technique such as bilinear resampling or bicubic resampling. Additional detail regarding resampling DCT data within the frequency domain is provided below with reference to FIG. 4.

The digital image resolution modification system can utilize sub-band approximation to reduce the size of the filtered data. In particular, the digital image resolution modification system can determine or identify sub-band relationships of DCT coefficients to ignore or refrain from utilizing higher-order DCT coefficients. Thus, the digital image resolution modification system can utilize sub-band approximation as a type of low-pass filtering operation in the transform domain by approximating DCT coefficients to generate modified DCT blocks of a target size. In some embodiments, the digital image resolution modification system can determine a target size for modified DCT blocks based on a target size of a compressed digital image. Additional detail regarding the sub-band approximation is provided below with reference to FIG. 5.

Based on the resized DCT blocks from sub-band approximation, the digital image resolution modification system can further implement a block composition technique to merge DCT blocks together. To elaborate, the digital image resolution modification system can combine resized DCT blocks within the DCT domain. In some embodiments, the digital image resolution modification system can determine a required size for DCT blocks to generate a modified digital image (as may be required by a particular digital image format such as JPEG). To merge DCT blocks, the digital image resolution modification system can apply a block composition matrix to convert a sequence of DCT blocks into a composite block. Additional detail regarding block composition is provided below with reference to FIG. 6.

As further mentioned, the digital image resolution modification system can encode the data of the composite block(s) to generate a modified digital image of a target resolution. In particular, the digital image resolution modification system can apply an encoding method to quantized DCT data. In some embodiments, the digital image resolution modification system utilizes a tiled Huffman encoding technique to code the DCT data. Thus, the digital image resolution modification system can quickly and efficiently generate a compressed digital image from the quantized DCT data.

As mentioned, many conventional digital image systems are inefficient. In particular, conventional systems often require a large memory footprint to generate and store many versions or resolutions of a single digital image for use on different types of computing devices or for different uses. For example, for some systems receive tens of millions of requests for JPEG renditions daily. In order to satisfy these requests, such systems can store petabytes of JPEGS. To enable a user to access a digital image via a mobile device or a laptop computer, conventional systems often generate and store (e.g., within a PTIFF container) different platform-specific resolutions of the digital image for different device types or screen sizes. The storage demands of these systems are further exacerbated when considering digital videos, high definition panoramic digital images, and 360-degree digital images, which contain larger amounts of data to be processed and stored. These conventional systems therefore require excessive amounts of computer storage, processing power, and memory to generate and store such large numbers of digital images for users across an entire user base. For example, some conventional systems generate PTIFF versions of digital images utilizing memory-heavy instances of AMAZON WEB SERVICES ("AWS") (e.g., AWS m5.large or c5.xlarge).

Due at least in part to the inefficiency of conventional digital image systems, these systems also suffer from problems of inflexibility. For instance, some conventional digital image systems require downsampling digital images within a spatial domain to modify resolutions of digital images. As a result of implementing such computationally-intensive geometrical downsampling techniques, these systems are limited to preprocessing applications (or high-power applications) and cannot flexibly adapt to generate or modify resolutions of digital images on the fly (e.g., on demand in real time or near real time). Indeed, the geometrical downsampling of conventional digital image systems is too slow and expensive for feasible real-time rendering on mobile devices or even on the web.

The digital image resolution modification system provides several advantages over conventional digital image systems. For example, the digital image resolution modification system improves efficiency over conventional systems. More specifically, the digital image resolution modification system can reduce the memory footprint, the number of computations, and processing power as compared to conventional systems. As described above, many conventional systems require excessive memory and power to store and generate multiple version of digital images. By contrast, as a result of performing DCT-based resampling of digital images in the frequency domain (including downsampling in the frequency domain), the digital image resolution modification system can modify the resolution of digital images much faster (e.g., in real time) and with less processing power than conventional systems. Because the digital image resolution modification system can modify resolutions of digital images in real time (or near real time), the digital image resolution modification system can generate modified digital images for presentation on different devices on demand.

Further, in contrast to conventional systems that require storing various resolutions of a single digital image (so that a user can access the digital image on devices of different screen sizes), the digital image resolution modification system need only store a single copy (or at least fewer copies by refraining from storing intermediate renditions) of a digital image. Indeed, due at least in part to the increased speed of the digital image resolution modification system, the digital image resolution modification system can modify the resolution of digital images on demand, thereby reducing (or eliminating) the need to store multiple versions. Thus, the digital image resolution modification system can greatly reduce the computer memory, computer storage, and computing power required by conventional systems to generate and store digital images.

Additionally, the digital image resolution modification system is more flexible than conventional digital image systems. To elaborate, as a result of utilizing more computationally efficient filtering processes, the digital image resolution modification system is compatible with mobile and/or web applications. Indeed, decoding and resizing a digital image requires a buffer of a size equivalent to the size of the entire digital image (e.g., width×height×component count bytes). For example, to modify the resolution of a panoramic digital image of dimension 17 k×4 k, a conventional system requires a buffer at least of size 420 MB for decoding and resizing. In contrast to conventional systems that require preprocessing digital images in advance and/or high-power computing devices to modify resolutions of digital images, however, the digital image resolution modification system can modify resolutions of digital images using affordable commodity hardware systems interactively in real time such as mobile devices or web devices. Indeed, because the digital image resolution modification system implements a tiled decoding and resizing method (to analyze individual tiled portions independently), the digital image resolution modification system greatly reduces the memory footprint required to modify the resolution of digital images. Further due to its efficient, interactive nature, the digital image resolution modification system is combinable with other digital image processing functions of digital image editing applications as well.

As illustrated by the foregoing discussion, the present disclosure utilizes a variety of terms to describe features and benefits of the digital image resolution modification system. Additional detail is hereafter provided regarding the meaning of these terms as used in this disclosure. In particular, the term "discrete cosine transform block" (or "DCT block") refers to a sequence of frequency data points that corresponds to a digital image. A DCT block can include frequency domain data in terms of a sum of cosine functions oscillating at different frequencies. For example, a DCT block can include frequency data that describes occurrences of various colors within a corresponding block of a digital image.

Relatedly, the term "tile" (or "tiled portion") refers to a portion of a digital image. In particular, a tile can include a rectangular portion of a digital image having a particular tile height (in pixels) and tile width (in pixels). In some embodiments, the digital image resolution modification system tiles a digital image to generate uniform tiles having equal heights and widths. A tile can include a number of pixels with color values. In some embodiments, the digital image resolution modification system tiles a digital image based on analyzing the digital image to identify a tile size that would be effective or computationally efficient for encoding the digital image into frequency domain data.

As mentioned, the digital image resolution modification system can filter DCT block frequency data in the frequency domain utilizing a resampling kernel. As used herein, the term "resampling kernel" refers to a function for resampling or filtering digital image data to remove some portion of the data. A resampling kernel can include a filtering window that the digital image resolution modification system passes over the frequency data of the digital image to remove or filter out various portions (e.g., frequencies). Indeed, the digital image resolution modification system can filter frequency data in multiple passes such as a vertical pass to change a vertical dimension of a digital image and a horizontal pass to change a horizontal dimension of the digital image. In these embodiments, a resampling kernel can include a vertical resampling kernel and/or a horizontal resampling kernel. In the same or other embodiments, a resampling kernel can include a Lanczos resampling kernel, a bilinear resampling kernel, or a bicubic resampling kernel.

As mentioned above, the digital image resolution modification system can utilize sub-band approximation to reduce the size of resampled digital image frequency data. As used herein, the term "sub-band approximation" refers to a technique or method to determine sub-band relationships between DCT coefficients. For example, sub-band approximation can include reducing the size of resampled digital image frequency data by reducing DCT block sizes, thereby removing or omitting some frequency data. In some embodiments, sub-band approximation can include converting coefficients of M-size DCT blocks into N-size blocks by a factor of N/M.

As also mentioned, the digital image resolution modification system can merge sub-band approximated DCT blocks using a block composition matrix. As used herein, the term "block composition matrix" refers to a matrix that can merge DCT blocks based on a target DCT block size. For instance, a block composition matrix can determine a target DCT block size based on a format of a digital image. Indeed, for JPEG images, the digital image resolution modification system utilizes a block composition matrix to generate 8×8 DCT blocks because of the compatibility of the JPEG standard. In some embodiments, a block composition matrix can convert a sequence of N-point DCT blocks into a composite DCT block.

Additional detail regarding the digital image resolution modification system will now be provided with reference to the figures. For example, FIG. 1 illustrates a schematic diagram of an example computing system environment for implementing a digital image resolution modification system 102 in accordance with one or more embodiments. An overview of the digital image resolution modification system 102 is described in relation to FIG. 1. Thereafter, a more detailed description of the components and processes of the digital image resolution modification system 102 is provided in relation to the subsequent figures.

As shown in FIG. 1, the environment includes server(s) 104, a client device 110, and a network 108. Each of the components of the environment can communicate via the network 108, and the network 108 may be any suitable network over which computing devices can communicate. Example networks are discussed in more detail below in relation to FIG. 12.

As mentioned, the environment includes a client device 110. In particular, the client device 110 can be one of a variety of computing devices, including a smartphone, a tablet, a smart a television, a desktop computer, a laptop computer, a virtual reality device, an augmented reality device, or some other computing device as described in relation to FIG. 12. The client device 110 can provide or display one or more user interfaces for viewing, selecting, manipulating, or editing digital images via the client application 112. The client device 110 can also receive user input from a user in the form of clicks, keyboard inputs, touchscreen inputs, etc. to perform various functions within, or apart from, the client application 112. In some embodiments, the client device 110 facilitate resizing and/or display of digital images, and the resizing can be performed in whole or in part by the server(s) 104 and/or the client device 110.

Particularly, the client device 110 include a client application 112 whereby a user can view or edit digital images. The client application 112 may be a web application, a native application installed on the client device 110 (e.g., a mobile application, a desktop application, etc.), or a cloud-based application where all or part of the functionality is performed by the server(s) 104. The client application 112 can present or display information to a user such as a collection of digital images and an editing interface for resizing or compressing (or otherwise manipulating) the digital images. Indeed, the client application 112 can present or display a selectable option to compress or modify the resolution of a digital image.

As illustrated in FIG. 1, the environment includes the server(s) 104. The server(s) 104 may generate, store, process, receive, and transmit electronic data, such as digital images and modified (e.g., resized, resolution-modified, or compressed) digital images. For example, the server(s) 104 can transmit data to the client device 110 to provide a user interface including digital images and/or editing options for display via the client application 112. The server(s) 104 may identify (e.g., monitor and/or receive) data from the client device 110 in the form of an input to compress or modify the resolution of a digital image. In some embodiments, the server(s) 104 comprises a digital content server. The server(s) 104 can also (or alternatively) comprise an application server, a communication server, a web-hosting server, a social networking server, a digital content campaign server, or a digital communication management server.

As shown in FIG. 1, the server(s) 104 can also include the digital image resolution modification system 102 (e.g., implemented as part of a digital content management system 106). Although FIG. 1 depicts the digital image resolution modification system 102 located on the server(s) 104, in some embodiments, the digital image resolution modification system 102 may be implemented by (e.g., located entirely or in part on) one or more other components of the environment. For example, the digital image resolution modification system 102 may be implemented by the client device 110, and/or a third-party device.

In some embodiments, though not illustrated in FIG. 1, the environment may have a different arrangement of components and/or may have a different number or set of components altogether. For example, the environment can include a database for storing information such as digital images. The database can be housed by the server(s) 104, the client device 110, and/or separately by a third party in communication via the network 108. In addition, the client device 110 may communicate directly with the digital image resolution modification system 102, bypassing the network 108.

Figure 2:
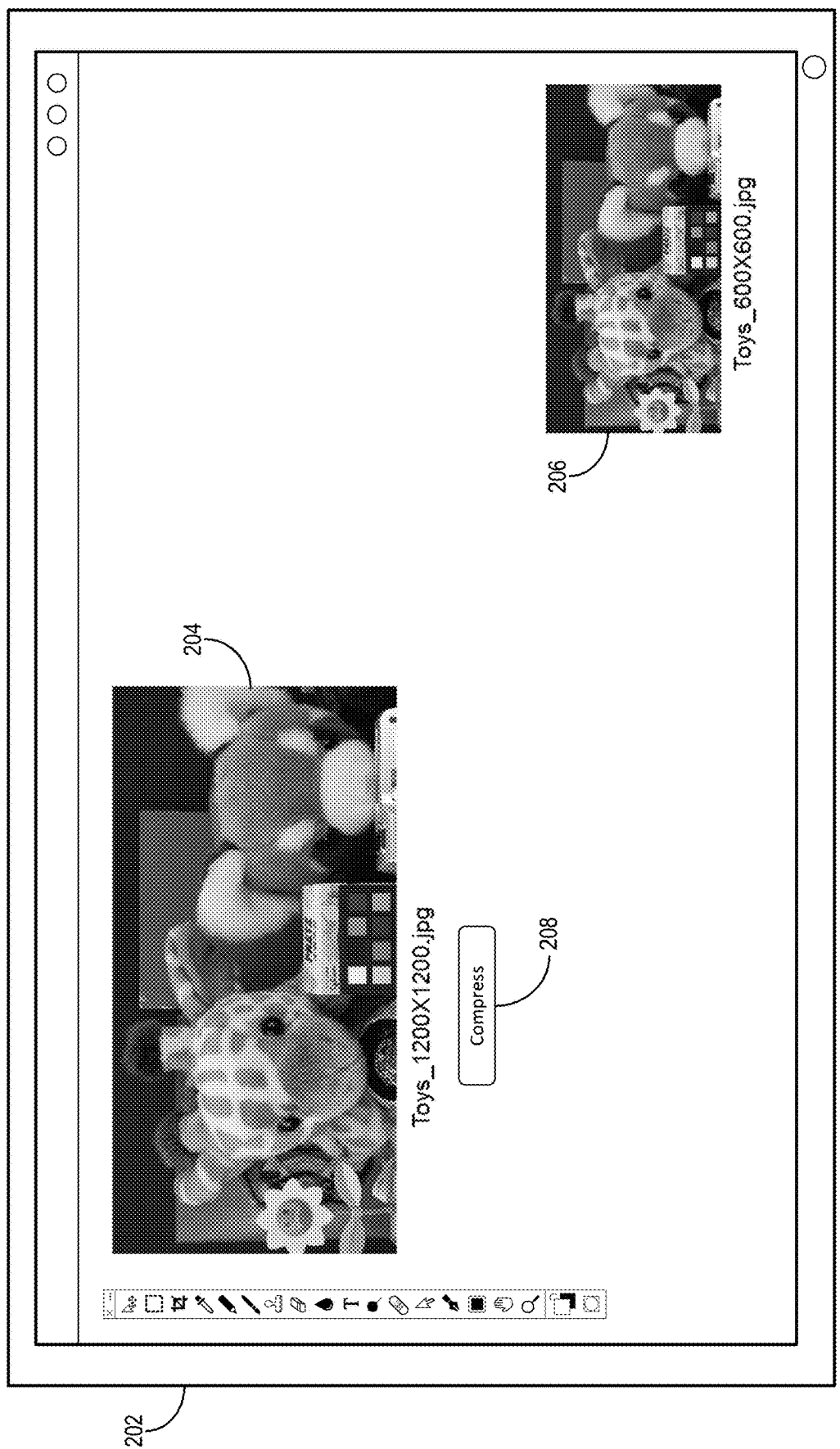
FIG. 2 illustrates an overview of a process of generating a modified digital image from an initial digital image in accordance with one or more embodiments.

As mentioned, the digital image resolution modification system 102 can generate a compressed, resized, or modified version of a digital image. FIG. 2 illustrates an example of generating a modified digital image 206 from a digital image 204 in accordance with one or more embodiments. As shown, the digital image resolution modification system 102 generates the modified digital image 206 having a resolution of 600×600 pixels from the initial digital image 204 having a resolution of 1200×1200 pixels. In the example of FIG. 2, the digital image 204 and the modified digital image 206 are in JPEG (or .jpg) format. However, the digital image resolution modification system 102 can compress or modify resolutions of digital images of other resolutions and/or different file types (e.g., raw digital images, GIF, PNG, TIFF, or BMP) as well.

As illustrated in FIG. 2, the digital image resolution modification system 102 identifies and presents the digital image 204 within a digital image editing interface displayed on the computing device 202 (e.g., the client device 110). The digital image resolution modification system 102 further presents a selectable user interface element such as the compress option 208. Upon detecting user input to select the compress option 208, the digital image resolution modification system 102 compresses the digital image 204 to generate the modified digital image 206 having a smaller resolution and including less digital image data as compared to the digital image 204. In some embodiments, the digital image resolution modification system 102 generates the modified digital image 206 on demand in real time (or near real time) based on detecting the user input to select the compress option 208. In the same or other embodiments, the digital image resolution modification system 102 enables the user to select or enter a target size or a target resolution of the modified digital image 206.

While FIG. 2 illustrates a computing device 202 in the form of a desktop computer, the digital image resolution modification system 102 can also present a modified digital image 206 via other types of computing devices such as mobile devices or web devices. For example, the digital image resolution modification system 102 can receive a request to view the digital image 204 from a mobile device (e.g., the client device 110), whereupon the digital image resolution modification system 102 can determine a target size or resolution of the digital image 204 based on the device type and/or screen size of the computing device. Indeed, rather than detecting a selection of the compress option 208, the digital image resolution modification system 102 can receive a request to view the digital image 204 (stored locally or cloud-stored) in the form of a user selection of a thumbnail (or other file indicator) within a digital image viewing interface. Further, the digital image resolution modification system 102 can generate a modified digital image (e.g., the modified digital image 206) in real time for display on the computing device based on the request. In these or other embodiments, the digital image resolution modification system 102 refrains from storing multiple resolutions of the digital image 204 because the digital image resolution modification system 102 can generate appropriately sized versions of the digital image 204 on demand as needed.

Figure 3:
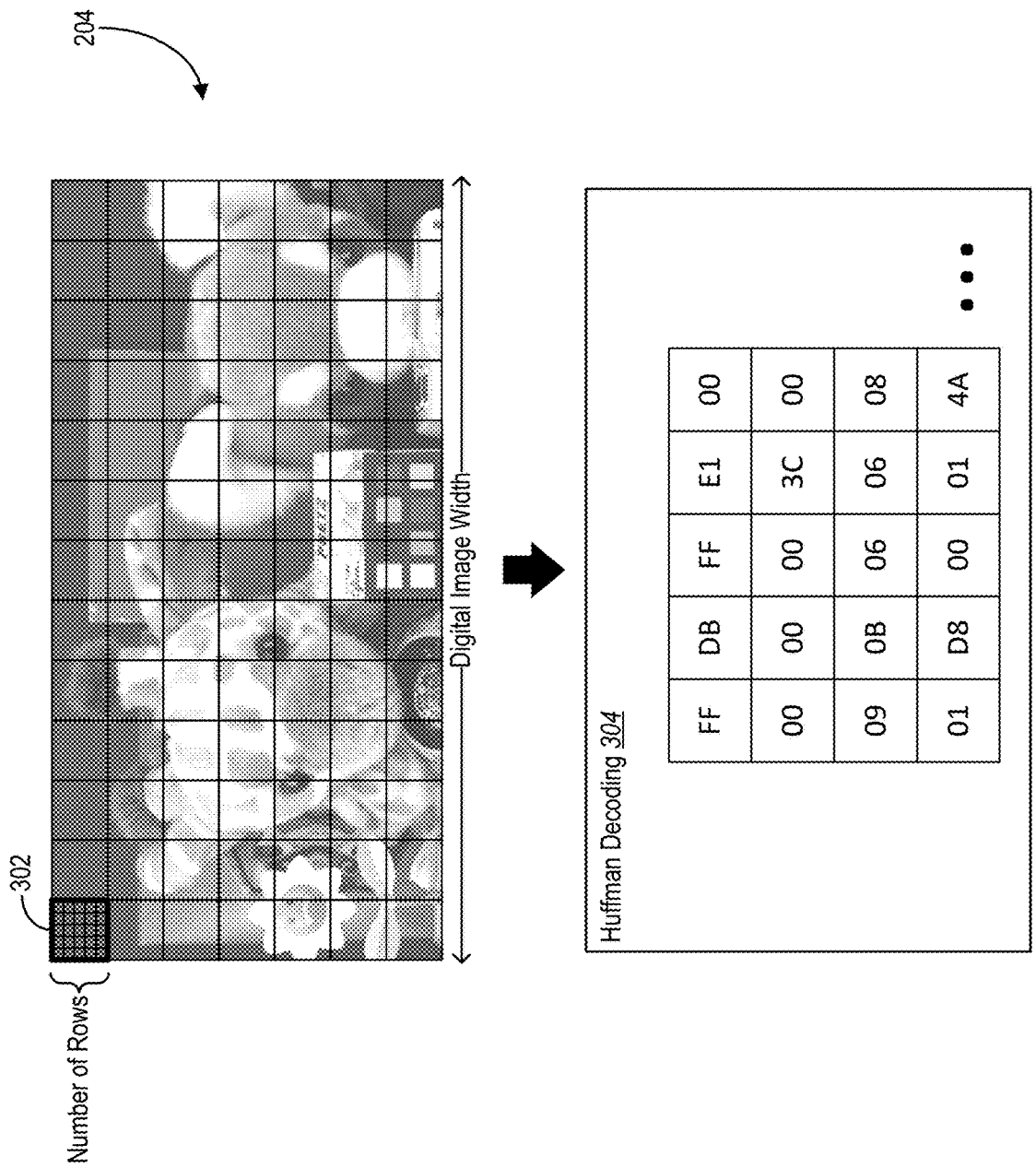
FIG. 3 illustrates an overview of a process of tiled decoding of a digital image in accordance with one or more embodiments.

As mentioned, the digital image resolution modification system 102 can generate modified digital images (e.g., the modified digital image 206) utilizing a DCT-based resampling process in the frequency domain. For example, FIG. 3 illustrates an example representation of generating DCT block for the digital image 204 (or a tile of the digital image 204). For example, the digital image resolution modification system 102 can encode the digital image 204 into the frequency domain in accordance with a file type of the digital image 204. For the JPEG standard, for example, the digital image resolution modification system 102 utilizes a Huffman decoding technique to obtain DCT block information for the digital image 204. For other digital image file types, the digital image resolution modification system 102 can utilize the same or a different technique to obtain DCT block information (or other frequency-based information) for the tiles of the digital image 204. In some embodiments, for instance, the digital image resolution modification system 102 utilizes a transform such as a discrete cosine transform to obtain DCT information, or the digital image resolution modification system 102 utilizes a Fourier transform to obtain other frequency information for the digital image 204.

As shown, in one or more embodiments, the digital image resolution modification system 102 can generate a tiled grid for the digital image 204. Indeed, the digital image resolution modification system 102 can analyze the digital image 204 to segment the digital image 204 into tiles including the tile 302. In some embodiments, the digital image resolution modification system 102 can define each tile (including the tile 302) to have uniform dimensions in rows and columns of pixels.

As illustrated in FIG. 3, the digital image resolution modification system 102 can encode the digital image data of each tile into DCT blocks of frequency data. In particular, the digital image resolution modification system 102 can generate DCT blocks of frequency data representing the digital image 204. More specifically, the digital image resolution modification system 102 can encode color values (e.g., RGB, HSV, or other color space values) into frequency values that represent frequencies at which particular colors (or ranges of colors) occur within the tiles (e.g., the tile 302).

In some embodiments, such as embodiments where the digital image 204 is a JPEG image, the digital image resolution modification system 102 can generate DCT blocks for the digital image utilizing Huffman decoding 304. Indeed, the digital image resolution modification system 102 determines DCT information based on a Huffman table for the JPEG image. To elaborate, JPEG compression uses the Huffman coding as entropy encoding to encode the digital image 204. For example, JPEG compression compresses color data by encoding a particular pixel value (or color value) within the tile 302 based on the frequency with which the value occurs within the tile 302. Thus, JPEG compression standard defines the digital image 204 with a Huffman table of Huffman code values. For example, the JPEG compression standard defines assigns an encoded value to a color value that occurs with a highest frequency in accordance with a Huffman table. Likewise, the JPEG compression standard defines assigns encoded frequency values for colors based on respective numbers (or frequencies) of occurrences relative to each other. The Huffman table of FIG. 3 is merely illustrative and does not necessarily represent actual values corresponding to the digital image 204.

The digital image resolution modification system 102 can access a Huffman table with Define Huffman Table ("DHT") markers for the digital image 204. The digital image resolution modification system 102 can utilize the Huffman table to obtain the frequency data (e.g., the DCT data) for each tile. In addition, the digital image resolution modification system 102 defines tiles (e.g., the tile 302) as data corresponding to the number of rows in the tile multiplied by the digital image width (in pixels). Thus, the digital image resolution modification system 102 can generate quantized DCT data for a specified tile (e.g., the tile 302) which the digital image resolution modification system 102 can use in subsequent steps for DCT-based resampling to modify the resolution of the digital image 204.

Figure 4:
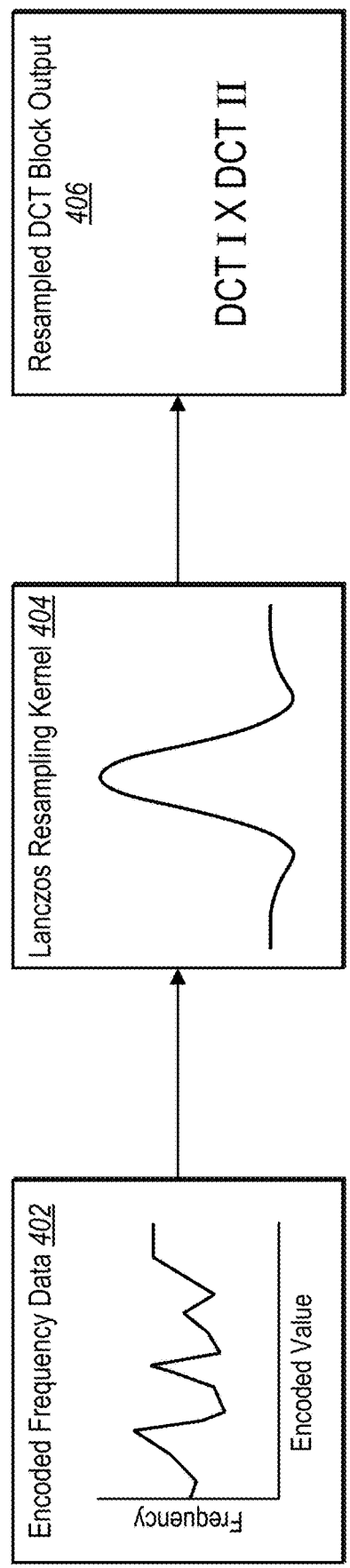
FIG. 4 illustrates an overview of a process of filtering quantized discrete cosine transform data within the frequency domain in accordance with one or more embodiments.

Indeed, as mentioned above, the digital image resolution modification system 102 can filter the quantized DCT data within the frequency domain. In particular, the digital image resolution modification system 102 can filter frequency data of DCT blocks (e.g., filter within the frequency domain). For example, FIG. 4 illustrates a process for filtering encoded frequency data 402 (e.g., the quantized DCT data) within the frequency domain in accordance with one or more embodiments. As shown, the digital image resolution modification system 102 can apply a resampling kernel to filter the encoded frequency data 402. Indeed, in some embodiments the digital image resolution modification system 102 can apply a Lanczos resampling kernel 404, while in other embodiments the digital image resolution modification system 102 can apply a different type of resampling kernel such as a bilinear resampling kernel or a bicubic resampling kernel.

As illustrated in FIG. 4, the digital image resolution modification system 102 can utilize a Lanczos resampling kernel 404 to resample or filter the encoded frequency data 402 of the digital image 204 within the frequency domain. By applying the Lanczos resampling kernel 404, the digital image resolution modification system 102 can determine new pixel values (e.g., encoded pixel values) as a weighted combination of surrounding pixel values. In some embodiments, the weights of various pixel values depend on respective distances between the new pixel location and the neighboring pixels combined to generate the new pixel value. For example, in one or more embodiments the digital image resolution modification system 102 can combine values only of immediate adjacent neighboring pixels, while in other embodiments the digital image resolution modification system 102 can combine values of more surrounding pixels farther removed (e.g., removed by a threshold number of pixels or pixel layers) from the new pixel. Particularly, the digital image resolution modification system 102 can utilize a particular function such as the Lanczos resampling kernel 404 to generate the weighted combination of pixel values. The digital image resolution modification system 102 thereby can generate the resampled DCT block output 406.

As mentioned, the digital image resolution modification system 102 can resample the encoded frequency data 402. Indeed, the digital image resolution modification system 102 can obtain the encoded frequency data 402 (e.g., tiled data of the digital image 204 in the DCT domain) from the Huffman decoding step. Additionally, rather than decoding the encoded frequency data 402 back to the spatial domain for filtering or resampling (as is required by many conventional digital image systems), the digital image resolution modification system 102 can resample the tiled encoded frequency data 402 directly within the frequency domain.

To perform Lanczos resampling within the frequency domain, the digital image resolution modification system 102 can utilize a convolution-multiplication property of the DCT blocks used for anti-aliasing low pass filters for digital image resizing. In particular, the digital image resolution modification system 102 can extend a multiplication property of Fourier transforms to trigonometric functions such as DCT blocks. Like discrete Fourier transforms where circular convolution holds the convolution-multiplication property, symmetric convolutions have similar properties for trigonometric transforms. Thus, the digital image resolution modification system 102 can map symmetric convolutions of digital images to a class of linear filtering operations in the transform domain.

Indeed, the digital image resolution modification system 102 can perform a resampling operation by applying the Lanczos resampling kernel 404 to DCT blocks of encoded frequency data 402 such that the symmetric convolution operation in the frequency domain becomes equivalent to the linear convolution in the spatial domain. To elaborate, the digital image resolution modification system 102 can implement the symmetric convolution via the convolution-multiplication property in accordance with the following rules. Let h(n), 0≤n≤N be a sequence of length N+1 (e.g., a sequence of digital image frequency data). Thus, for this sequence, the N-point one-dimensional type-I DCT ("DCTI") is defined by:

$$C_{1e}\{h(n)\} = H_I^{(N)}(k) = \sqrt{\frac{2}{N}} \alpha(k) \sum_{n=0}^{N} h(n) \cos\left(\frac{n\pi k}{N}\right), 0 \leq k \leq N$$

where α(k) is $\sqrt{1/2}$ for k=0, otherwise its value is 1. Additionally, let x(n), 0≤n≤N−1 be a sequence of length N. Thus, for this sequence, the N-point one-dimensional type-II DCT ("DCTII") is defined by:

$$C_{2e}\{x(n)\} = X_{II}^{(N)}(k) = \sqrt{\frac{2}{N}} \alpha(k) \sum_{n=0}^{N-1} x(n) \cos\left(\frac{(2n+1)\pi k}{2N}\right), 0 \le k \le N-1$$

where α(k) is $\sqrt{1/2}$ for k=0, otherwise its value is 1. The DCTI is defined with N+1 samples, whereas the DCTII is defined with N samples. Additionally, the DCTI and the DCTII can be considered as generalized discrete Fourier transforms ("GDFT") of symmetrically extended sequences. After symmetric extensions, the resulting periods in both the DCTI and the DCTII are 2N. For the DCTI, the digital image resolution modification system 102 carries out the symmetric extension of the N+1 samples as follows:

$$\hat{h}(n) = \begin{cases} h(n), & 0 \le n \le N \\ h(2N-n), & N+1 \le n \le 2N-1 \end{cases}$$

where ĥ(n) is the type-I symmetric extension of h(n).

For the DCTII, on the other hand, the digital image resolution modification system 102 can carry out the symmetric extension of the length-N input sequence as follows (before applying GDFT):

$$\hat{x}(n) = \begin{cases} x(n), & 0 \le n \le N-1 \\ x(2N-1-n), & N \le n \le 2N-1 \end{cases}$$

where x̂(n) is the type-II symmetric extension of x(n).

The digital image resolution modification system 102 thus can determine the symmetric convolution of two finite-length sequences (of frequency data) by determining the periodic convolution of their symmetrically extended sequences (having the same periods). The digital image resolution modification system 102 can determine the output of this operation for a specific interval. For instance, for the two sequences h(n), 0≤n≤N and x(n), 0≤n≤N−1, the digital image resolution modification system 102 can determine the symmetric convolution based on the periodic convolution of the symmetric extensions ĥ(n) and x̂(n), as given by:

$$\begin{aligned} y(n) &= x(n) \circledS h(n) \\ &= \hat{x}(n) \circledast^{2N} \hat{h}(n) \\ &= \sum_{k=0}^{n} \hat{x}(n)\hat{h}(n-k) + \\ &\quad \sum_{k=n+1}^{2N-1} \hat{x}(n)\hat{h}(n-k+2N), 0 \le n \le N-1 \end{aligned}$$

where ⓢ denotes a symmetric convolution operator and ⊛ denotes a periodic convolution operator.

Furthermore, convolution-multiplication properties hold for trigonometric transforms with symmetric convolution. Thus, the digital image resolution modification system 102 can represent this property by:

$$C_{2e}\{x(n) \circledS h(n)\} = C_{2e}\{x(n)\} C_{1e}\{h(n)\}.$$

The digital image resolution modification system 102 can further extend the above equations and concepts to two dimensions. Thus, the digital image resolution modification system 102 can define a two-dimensional M×N-point type-I DCT over (M+1)×(N+1) samples. The digital image resolution modification system 102 further can define a two-dimensional type-II DCT over M×N samples. For example, the digital image resolution modification system 102 can generate the type-I DCT of x(m, n) as $C_{1e}\{x(m, n)\}$, and the digital image resolution modification system 102 can generate the type-II DCT of x(m, n) as $C_{2e}\{x(m, n)\}$. In some embodiments, the digital image resolution modification system 102 can determine the two-dimensional DCTI and the two-dimensional DCTII by:

$$C_{2e}\{x(m,n)\bar{\circledS}h(m,n)\} = C_{2e}\{x(m,n)\} C_{1e}\{x(m,n)\}.$$

In these or other embodiments, as mentioned above, the digital image resolution modification system 102 can utilize the Lanczos resampling kernel 404 to perform Lanczos resampling. For example, the digital image resolution modification system 102 can define the Lanczos resampling kernel 404 as:

$$\begin{bmatrix}
\begin{bmatrix} Lanczos(0,0), Lanczos(0,1), Lanczos(0,2), Lanczos(0,3), \\ Lanczos(0,4), Lanczos(0,5), Lanczos(0,6), Lanczos(0,7), \\ Lanczos(0,8) \end{bmatrix}, \\
\begin{bmatrix} Lanczos(1,0), Lanczos(1,1), Lanczos(1,2), Lanczos(1,3), \\ Lanczos(1,4), Lanczos(1,5), Lanczos(1,6), Lanczos(1,7), \\ Lanczos(1,8) \end{bmatrix}, \\
\begin{bmatrix} Lanczos(2,0), Lanczos(2,1), Lanczos(2,2), Lanczos(2,3), \\ Lanczos(2,4), Lanczos(2,5), Lanczos(2,6), Lanczos(2,7), \\ Lanczos(2,8) \end{bmatrix}, \\
\begin{bmatrix} Lanczos(3,0), Lanczos(3,1), Lanczos(3,2), Lanczos(3,3), \\ Lanczos(3,4), Lanczos(3,5), Lanczos(3,6), Lanczos(3,7), \\ Lanczos(3,8) \end{bmatrix}, \\
\begin{bmatrix} Lanczos(4,0), Lanczos(4,1), Lanczos(4,2), Lanczos(4,3), \\ Lanczos(4,4), Lanczos(4,5), Lanczos(4,6), Lanczos(4,7), \\ Lanczos(4,8) \end{bmatrix}, \\
\begin{bmatrix} Lanczos(5,0), Lanczos(5,1), Lanczos(5,2), Lanczos(5,3), \\ Lanczos(5,4), Lanczos(5,5), Lanczos(5,6), Lanczos(5,7), \\ Lanczos(5,8) \end{bmatrix}, \\
\begin{bmatrix} Lanczos(6,0), Lanczos(6,1), Lanczos(6,2), Lanczos(6,3), \\ Lanczos(6,4), Lanczos(6,5), Lanczos(6,6), Lanczos(6,7), \\ Lanczos(6,8) \end{bmatrix}, \\
\begin{bmatrix} Lanczos(7,0), Lanczos(7,1), Lanczos(7,2), Lanczos(7,3), \\ Lanczos(7,4), Lanczos(7,5), Lanczos(7,6), Lanczos(7,7), \\ Lanczos(7,8) \end{bmatrix}, \\
\begin{bmatrix} Lanczos(8,0), Lanczos(8,1), Lanczos(8,2), Lanczos(8,3), \\ Lanczos(8,4), Lanczos(8,5), Lanczos(8,6), Lanczos(8,7), \\ Lanczos(8,8) \end{bmatrix}
\end{bmatrix}$$

where the digital image resolution modification system 102 evaluates Lanczos(x, y) utilizing a method based on the following algorithm:

if ((x<a and x>−a) and (y<a and y>−a)):
    return   np.sinc(np.pi*x)*np.sinc(np.pi*x/a)*np.sinc(np.pi*y)*np.sinc(np.pi*y/a)
else:
    return 0
and where a=3.

Thus, the digital image resolution modification system 102 can generate the DCTI and the DCTII utilizing a Lanczos resampling kernel 404. For example, the digital image resolution modification system 102 can generate the DCTI of this window, as given by:

$$\begin{bmatrix} \begin{bmatrix} 1.00741142, 1.00608947, 1.00276877, 0.99902655, \\ 0.99650421, 0.99602966, 0.99723123, 0.99885433, \\ 0.99958017 \end{bmatrix}, \\ \begin{bmatrix} 0.00197232, 0.00196973, 0.00196323, 0.00195591, \\ 0.00195097, 0.00195004, 0.00195239, 0.00195557, \\ 0.00195699 \end{bmatrix}, \\ \begin{bmatrix} 0.00176085, 0.00175854, 0.00175274, 0.0017462, \\ 0.00174179, 0.00174096, 0.00174306, 0.00174589, \\ 0.00174716 \end{bmatrix}, \\ [0, 0, 0, 0, 0, 0, 0, 0, 0], \\ [0, 0, 0, 0, 0, 0, 0, 0, 0], \\ [0, 0, 0, 0, 0, 0, 0, 0, 0], \\ [0, 0, 0, 0, 0, 0, 0, 0, 0], \\ [0, 0, 0, 0, 0, 0, 0, 0, 0], \\ [0, 0, 0, 0, 0, 0, 0, 0, 0] \end{bmatrix}.$$

Further, the digital image resolution modification system 102 can perform element-wise multiplication of the above DCTI Lanczos window and the DCTII of in the input DCT block to generate the resampled DCT block output 406. For example, the digital image resolution modification system 102 can generate an 8×8 DCT block output for compressing the digital image 204 in the form of a JPEG. In embodiments where the digital image 204 is a different type of digital image, however, the DCT block may have different dimensions.

In some embodiments, the digital image resolution modification system 102 can apply the Lanczos resampling kernel 404 more than once. Indeed, the digital image resolution modification system 102 can utilize the above equations and processes to apply the Lanczos resampling kernel 404 to implement a first pass for horizontal resampling and a second pass for vertical sampling. For example, the digital image resolution modification system 102 can apply a horizontal resampling kernel (e.g., a horizontal Lanczos resampling kernel) for modifying the horizontal dimension (e.g., width) of the digital image 204.

In these or other embodiments, the digital image resolution modification system 102 utilizes the above equations and processes to apply the Lanczos resampling kernel 404 to implement a second pass for vertical resampling. For example, the digital image resolution modification system 102 can apply a vertical resampling kernel (e.g., a vertical Lanczos resampling kernel) for modifying the vertical dimension (e.g., height) of the digital image. In some embodiments, the digital image resolution modification system 102 can perform the vertical resampling before (e.g., as a first pass) the horizontal resampling (e.g., as a second pass) or vice-versa.

For digital images and/or digital videos of more than two dimensions (e.g., three dimensional digital images), the digital image resolution modification system 102 can utilize additional passes for applying resampling kernels. Indeed, in some embodiments, the digital image resolution modification system 102 can resample a digital image using the same number of passes as dimensions of the digital image to modify each dimension independently.

As mentioned, the digital image resolution modification system 102 can apply the Lanczos resampling kernel 404 to resample the digital image 204 (or the encoded frequency data 402 of the digital image) in some embodiments. However, other resampling schemes are also possible. For example, in some embodiments the digital image resolution modification system 102 can implement bilinear resampling. For example, the digital image resolution modification system 102 can apply a bilinear resampling kernel to determine new pixel values using linear interpolation. In accordance with bilinear resampling, when upsampling, the digital image resolution modification system 102 can operate on (e.g., generates a weighted combination based on) the 2×2 cell of pixels (or encoded frequency data of the pixels) surrounding each new pixel location.

In one or more embodiments, the digital image resolution modification system 102 can implement bicubic resampling. In particular, the digital image resolution modification system 102 can apply a bicubic resampling kernel in the form of a cubic spline. Thus, the digital image resolution modification system 102 can determine new pixel values based on applying a cubic spline to combine pixel values of pixels (or encoded frequency data of the pixels) identified by the cubic spline.

In addition to the techniques described above, the digital image resolution modification system 102 can utilize the convolution-multiplication property explained by S. A. Martucci in *Symmetric Convolution and the Discrete Sine and Cosine Transforms*, IEEE Trans. on Signal Processing, vol. 42, 1038-51 (May 1994), which is incorporated by reference herein in its entirety. Further, the digital image resolution modification system 102 can utilize one or more image processing methods described by Jayanta Mukherjee and Sanjit K. Mitra in *Image Filtering in the Compressed Domain*, Lecture Notes in Computer Science, vol. 4338, 194-205, which is incorporated by reference herein in its entirety.

The algorithms described in reference to FIG. 4 can comprise the corresponding structure for performing a step for filtering the frequency data in a frequency domain. Alternatively, the acts described in reference to FIG. 4 can comprise the corresponding structure for performing a step for resampling the frequency data in a frequency domain.

Figure 5:
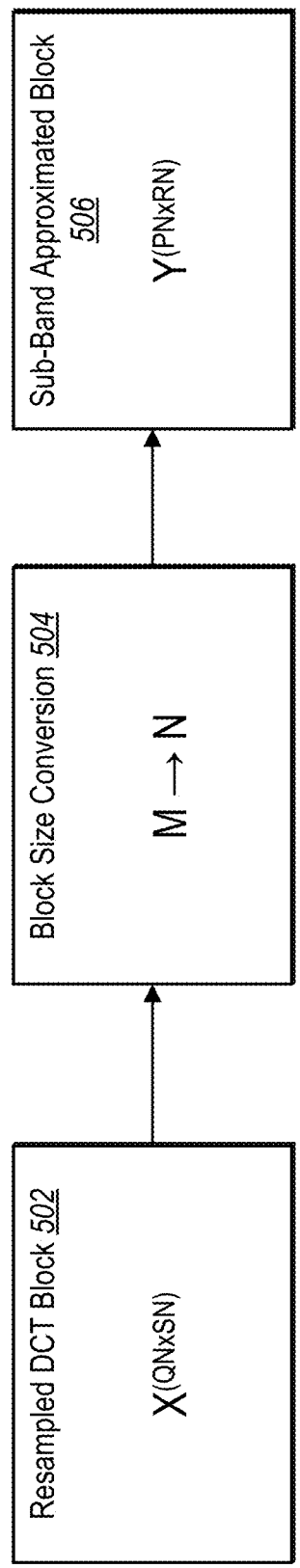
FIG. 5 illustrates an overview of a process of sub-band approximation in accordance with one or more embodiments.

As mentioned, the digital image resolution modification system 102 can utilize sub-band approximation to reduce the size of the filtered/resampled data (e.g., the resampled DCT block output 406). For example, the digital image resolution modification system 102 can reduce the size of the filtered frequency data utilizing sub-band approximation to generate modified discrete cosine transform blocks comprising dimensions that are smaller than dimensions of the discrete cosine transform blocks. FIG. 5 illustrates an example process for applying sub-band approximation to a resampled DCT block 502 in accordance with one or more embodiments. As shown, the digital image resolution modification system 102 can perform a block size conversion 504 to the resampled DCT block 502 to generate the sub-band approximated block 506. Likewise, the digital image resolution modification system 102 can generate sub-band approximated blocks for other resampled DCT blocks of the digital image 204 in a similar fashion.

As illustrated, the digital image resolution modification system 102 can implement the block size conversion 504. In particular, the digital image resolution modification system 102 can resize the resampled DCT block 502 to a smaller size based on a target size of a modified, resized digital image (e.g., the modified digital image 206). Thus, the digital image resolution modification system 102 can generate the sub-band approximated block 506 having smaller dimensions than the resampled DCT block 502. In some embodiments, the digital image resolution modification system 102 can generate the sub-band approximated block 506 having dimensions appropriate for particular digital image file types. Indeed, for a JPEG, the digital image resolution modification system 102 can generate the sub-band approximated block 506 with dimensions of 4×4 pixels.

To generate the sub-band approximated block 506 via the block size conversion 504, the digital image resolution modification system 102 can utilize sub-band relationships of the DCT coefficients for downsampling (and upsampling). In particular, the digital image resolution modification system 102 can ignore higher-order DCT coefficients (e.g., coefficients whose order exceeds a threshold) to implement a type of low-pass filter in the transform domain, which is more accurate than some conventional low-pass filtering operations. For example, the digital image resolution modification system 102 can convert the resampled DCT block 502 of size M into a sub-band approximated block 506 of size N. This operation effectively provides resizing of DCT blocks by a factor of N/M.

For example, the digital image resolution modification system 102 can perform the block size conversion 504 for sub-band approximation in accordance with a particular function. For example, the digital image resolution modification system 102 can determine the relationship of N-point DCT coefficients X(N) with the N/2-point coefficients of a downsampled form $X_D^{N/2}$ of a DCT block in accordance with:

$$X^{(N)} = \sqrt{2} \begin{bmatrix} X_D^{(N/2)} \\ 0_{\frac{N}{2} \times 1} \end{bmatrix}$$

where an m×n block of zeroes is denoted as $0_{m \times n}$.

The digital image resolution modification system 102 further can generalize the above relationship to accommodate conversion by integral factors L and M for a two-dimensional DCT block, as given by:

$$X^{(LN \times MN)} = \sqrt{LM} \begin{bmatrix} X_D^{(N \times N)} & 0_{N \times (M-1)N} \\ 0_{(L-1)N \times N} & 0(L-1) \times (M-1)N \end{bmatrix}.$$

In some embodiments, the digital image resolution modification system 102 can generate the sub-band approximated block 506 from the input resampled DCT block 502 based on the following:

$$Y^{(PN \times RN)} = \sqrt{\frac{PR}{QS}} X^{(QN \times SN)}, P \leq Q, R \leq S$$

$$= \sqrt{\frac{PR}{QS}} \begin{bmatrix} X^{(QN \times SN)} \\ 0_{(P-Q)N \times RN} \end{bmatrix}, P > Q, R \leq S$$

$$= \sqrt{\frac{PR}{QS}} [X^{(QN \times SN)} \; 0_{PN \times (R-S)N}], P \leq Q, R > S$$

$$= \sqrt{\frac{PR}{QS}} \begin{bmatrix} X^{(QN \times SN)} & 0_{QN \times (R-S)N} \\ 0_{(P-Q)N \times SN} & 0_{(P-Q)N \times (R-S)N} \end{bmatrix}, P > Q, R > S$$

where $Y^{(PN \times RN)}$ represents the sub-band approximated block 506 and $X^{(QN \times SN)}$ represents the input block (e.g., the resampled DCT block 502). In some embodiments, the digital image resolution modification system 102 can utilize one or more method or processes for sub-band approximation described by J. Mukhopadhyay in *Image and Video Processing in the Compressed Domain*, CRC Press (2011), which is incorporated by reference herein in its entirety.

As mentioned, the digital image resolution modification system 102 can perform block composition (or block decomposition) to generate composite DCT blocks of a particular size (e.g., as required by a particular digital image format). In particular, the digital image resolution modification system 102 can merge modified discrete cosine transform blocks utilizing a block composition matrix. For example, the digital image resolution modification system 102 can generate a composition DCT block having dimensions of 8×8 pixels for a JPEG image. Indeed, FIG. 6 illustrates an example process for generating a composite DCT block 606 utilizing a block composition technique in accordance with one or more embodiments.

Figure 6:
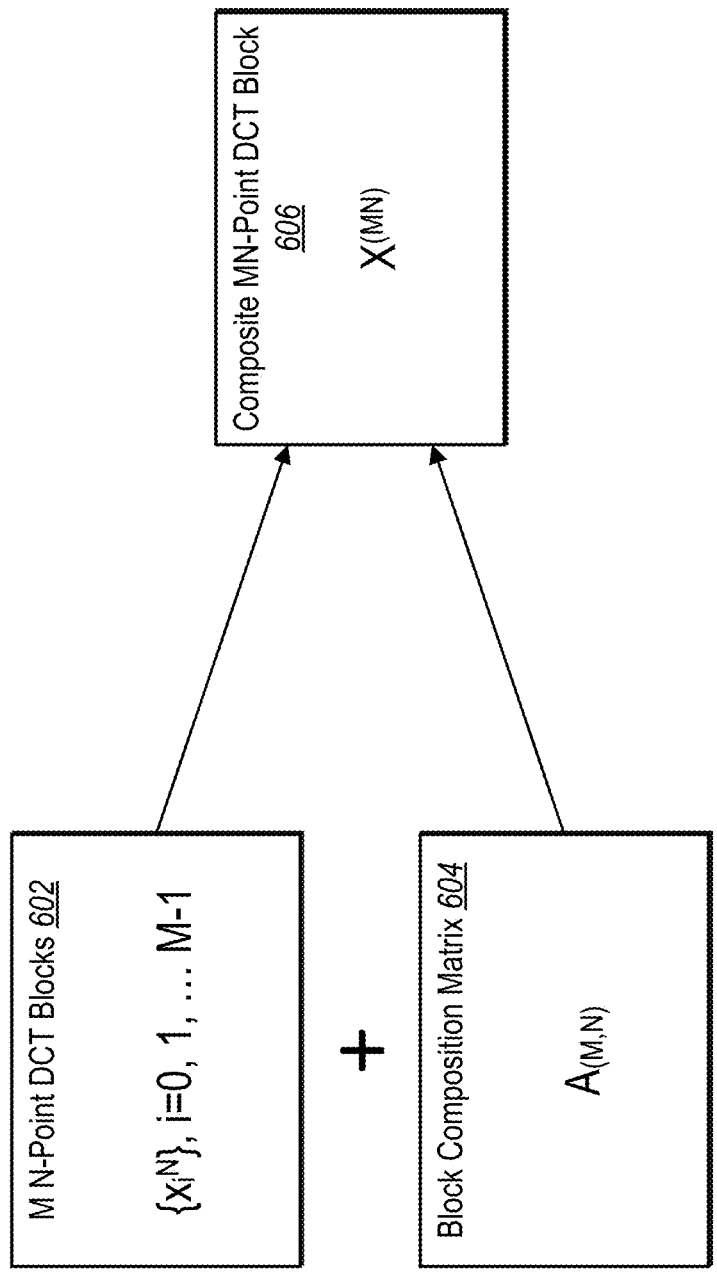
FIG. 6 illustrates an overview of a process of block composition in accordance with one or more embodiments.

As illustrated in FIG. 6, the digital image resolution modification system 102 can merge M adjacent N-point DCT blocks 602 by utilizing a block composition matrix 604. In particular, the digital image resolution modification system 102 can combine the M N-point DCT blocks 602 (e.g., the N-point DCT blocks from the sub-band approximation process) into a single MN-point block directly in the DCT domain. Indeed, the digital image resolution modification system 102 can utilize one or more methods or process described by J. Jiang and G. Feng in *The Spatial Relationships of DCT Coefficients Between a Block and its Sub-blocks*, IEEE Trans. on Signal Processing, 50(5), 1160-69 (2002), which is incorporated by reference herein in its entirety. For instance, the digital image resolution modification system 102 can generate the composite DCT block 606 in accordance with the following operations:

$$X^{(MN)} = A_{(M,N)}[X_0^{(N)} X_1^{(N)} ... X_{M-1}^{(N)}]^T$$

where $A_{(M,N)}$ represents the block composition matrix 604. In particular, the digital image resolution modification system 102 can generate the block composition matrix 604 given by:

$$A_{(M,N)} = C_{MN} \begin{bmatrix} C_N^{-1} & 0_N & 0_N & \cdots & 0_N & 0_N \\ 0_N & C_N^{-1} & 0_N & \cdots & 0_N & 0_N \\ \vdots & \vdots & \vdots & \ddots & \vdots & \vdots \\ 0_N & 0_N & 0_N & \cdots & C_N^{-1} & 0_N \\ 0_N & 0_N & 0_N & \cdots & 0_N & C_N^{-1} \end{bmatrix}$$

where $0_N$ represents an N×N block of zeroes.

For two-dimensional digital images (e.g., the digital image 204), the digital image resolution modification system 102 can merge L×M collocated DCT blocks as follows:

$$X^{(LN \times MN)} = A_{(L,N)} \begin{bmatrix} X_{0,0}^{(N \times N)} & X_{0,1}^{(N \times N)} & \cdots & X_{0,M-1}^{(N \times N)} \\ X_{1,0}^{(N \times N)} & X_{1,1}^{(N \times N)} & \cdots & X_{1,M-1}^{(N \times N)} \\ \vdots & \vdots & \ddots & \vdots \\ X_{L-1,0}^{(N \times N)} & X_{L-1,1}^{(N \times N)} & \cdots & X_{L-1,M-1}^{(N \times N)} \end{bmatrix} A_{(M,N)}^T.$$

In some embodiments, the digital image resolution modification system 102 can perform the inverse operation to block composition by implementing a block decomposition technique, as given by:

$$\begin{bmatrix} X_{0,0}^{(N \times N)} & X_{0,1}^{(N \times N)} & \cdots & X_{0,M-1}^{(N \times N)} \\ X_{1,0}^{(N \times N)} & X_{1,1}^{(N \times N)} & \cdots & X_{1,M-1}^{(N \times N)} \\ \vdots & \vdots & \ddots & \vdots \\ X_{L-1,0}^{(N \times N)} & X_{L-1,1}^{(N \times N)} & \cdots & X_{L-1,M-1}^{(N \times N)} \end{bmatrix} = A_{(L,N)}^{-1} X^{(LN \times MN)} A_{(M,N)}^{-1T}.$$

In these or other embodiments, the digital image resolution modification system 102 can utilize an arbitrary resizing technique in the frequency domain. For example, the digital image resolution modification system 102 can utilize arbitrary downsampling in accordance with one of two methods. In some embodiments, the digital image resolution modification system 102 can implement block composition (as described in relation to FIG. 6) followed by sub-band approximation and block decomposition to resize DCT blocks of total size LN×MN to ratio $$\left( \frac{P}{L} \times \frac{Q}{M} \right),$$

as represented by:

$L \times M_{(N \times N)} \Rightarrow$ (Block Comp.)$\Rightarrow LN \times MN \Rightarrow$ (Sub–bandapp.)$\Rightarrow PN \times QN \Rightarrow$ (Block Decomp.)$\Rightarrow P \times Q(N \times N)$.

In other embodiments, the digital image resolution modification system 102 can perform sub-band approximation (as described in relation to FIG. 5) followed by block composition and block decomposition, as given by:

$L \times M_{(N \times N)} \Rightarrow$ (Sub-band app.) $\Rightarrow L \times M_{(NP/L \times NQ/M)} \Rightarrow$ (Block Comp.) $\Rightarrow PN \times QN \Rightarrow P \times Q_{(N \times N)}$.

Figure 7:
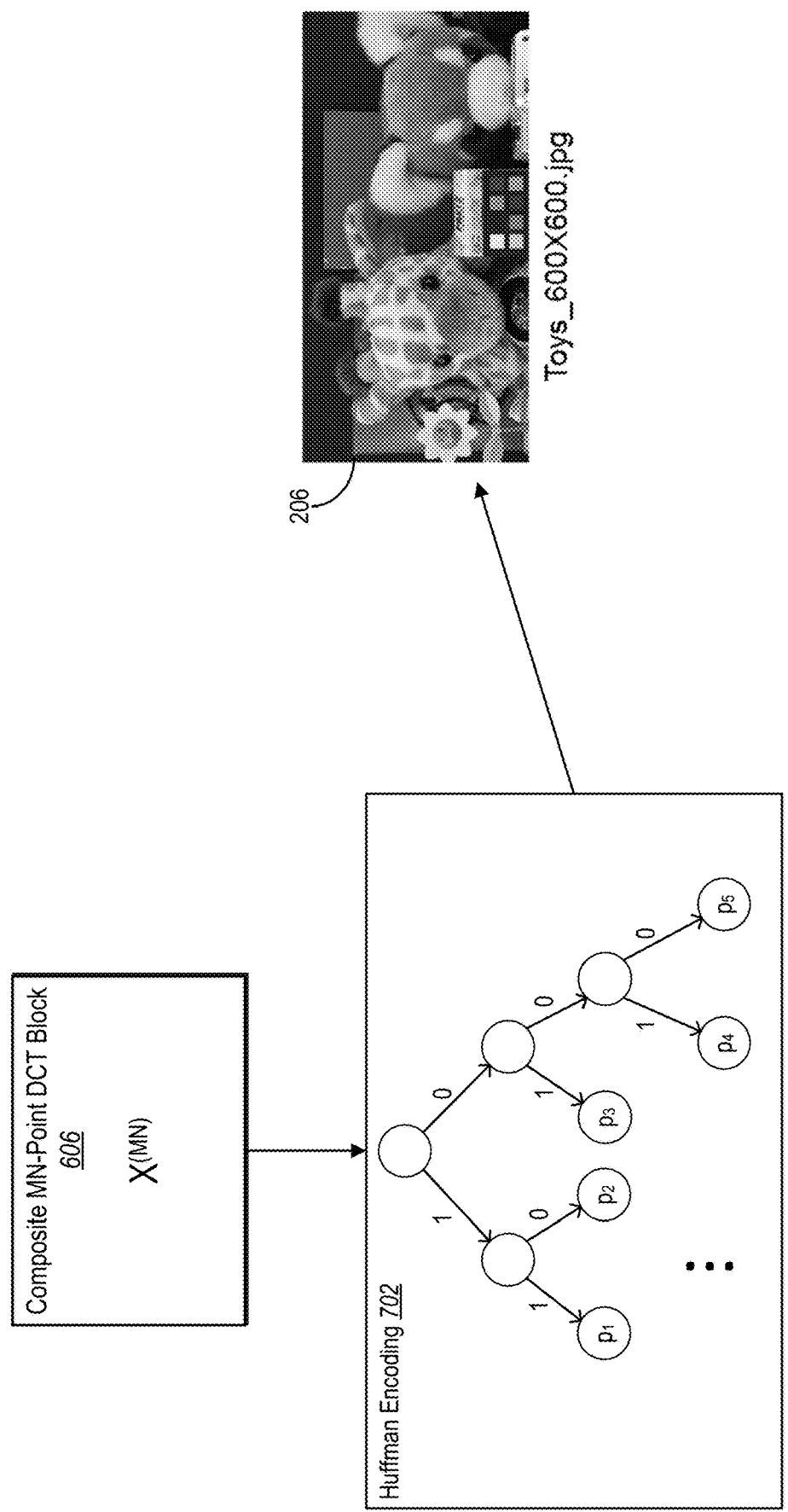
FIG. 7 illustrates an overview of a process of tiled encoding in accordance with one or more embodiments.

As mentioned, the digital image resolution modification system 102 can decode the quantized DCT data within a composite DCT block (e.g., the composite MN-point DCT block 606) to generate a modified digital image (e.g., the modified digital image 206). In particular, the digital image resolution modification system 102 can generate the modified digital image 206 of a target resolution by encoding the merged discrete cosine transform blocks utilizing Huffman encoding. FIG. 7 illustrates an example process for decoding the DCT data to generate the modified digital image 206 in accordance with one or more embodiments.

As illustrated in FIG. 7, the digital image resolution modification system 102 can utilize a tiled Huffman encoding technique to code the quantized DCT data. In particular, Huffman encoding is particularly effective for JPEG digital images. Thus, to generate the modified digital image 206, the digital image resolution modification system 102 can apply the Huffman encoding 702 to the composite MN-point DCT block 606.

To elaborate, the digital image resolution modification system 102 can performs the opposite operation to the Huffman decoding 304 described in relation to FIG. 3. Particularly, the digital image resolution modification system can encode the quantized DCT data (contained within the composite MN-point DCT block 606) based on a Huffman table (e.g., the same Huffman table utilized for the Huffman decoding 304 or a different predetermined Huffman table). In some embodiments, the digital image resolution modification system 102 can generate a Huffman table from the tiled data itself to utilize for the Huffman encoding 702. The digital image resolution modification system 102 further can store the coded data and the Huffman table as a JPEG (or other file type) per specification in the file. Thus, a computing device (e.g., the client device 110) can access the coded data and the corresponding table to present the modified digital image 206 for display.

Figure 8:
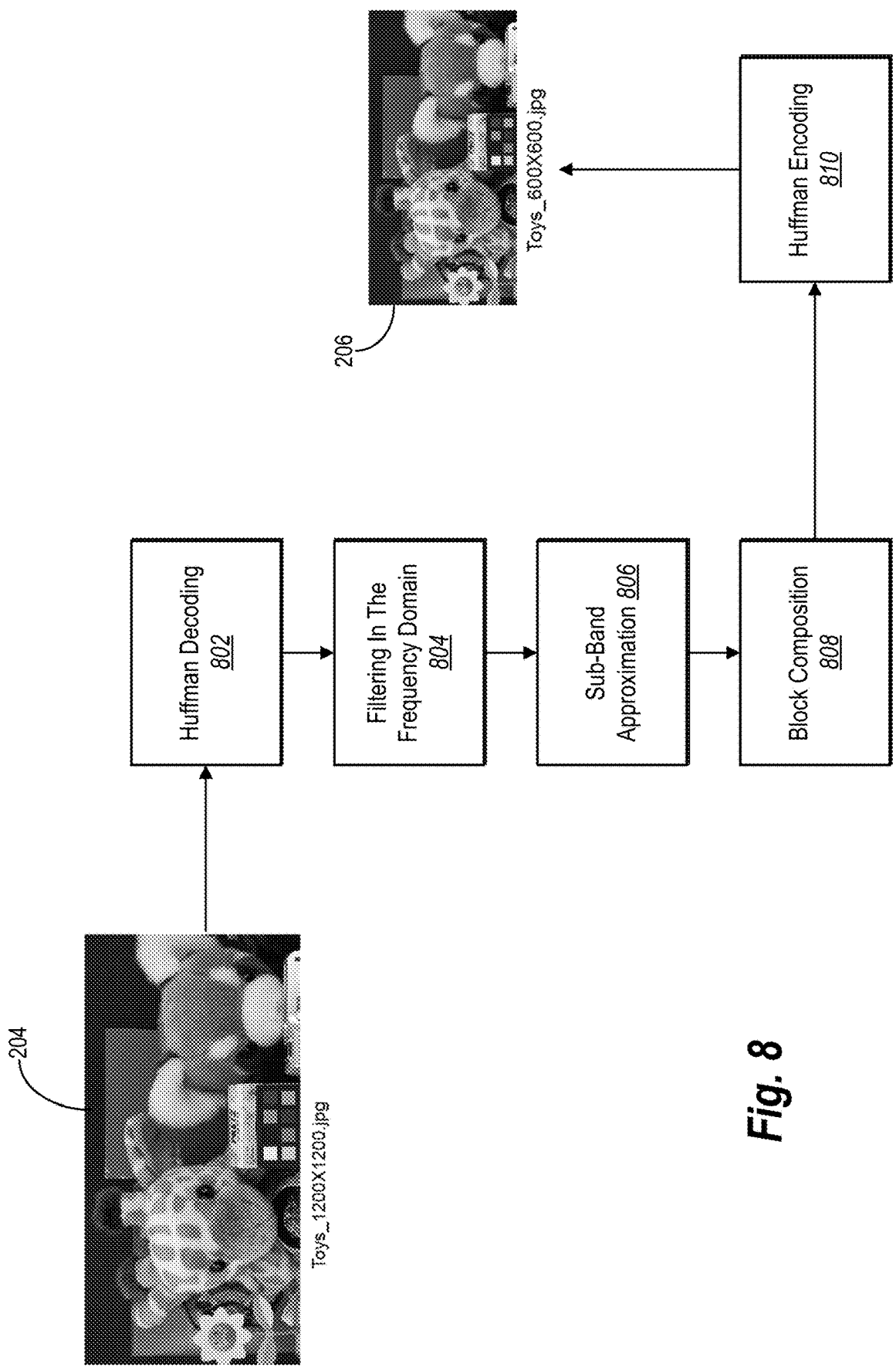
FIG. 8 illustrates an overview of a process of modifying a resolution of a digital image using resampling in the frequency domain in accordance with one or more embodiments.

The description of FIGS. 3-7 describe a procedure for generating the modified digital image 206 from the digital image 204 within an unconstrained environment by resampling in the frequency domain. The digital image resolution modification system 102 can implement the process on the entire image or incrementally by processing tiles of the digital image. Indeed, for each subsequent tile, the digital image resolution modification system 102 repeats the procedures described in FIGS. 3-7 until the complete digital image 204 is analyzed and compressed. In some embodiments, however, the digital image resolution modification system 102 can be implemented within a constrained environment to reduce resampling time without necessarily utilizing a tiling procedure. Indeed, FIG. 8 illustrates an example sequence of acts for modifying the resolution of the digital image 204 to generate the modified digital image 206 within a constrained environment and without utilizing a tiling procedure.

As shown, the digital image resolution modification system 102 can perform an act 802 to implement Huffman decoding for the digital image 204. For instance, rather than utilizing Huffman decoding for individual tiles, the digital image resolution modification system 102 can decode the entire digital image 204 to generate quantized DCT blocks.

Similar to the above description, the digital image resolution modification system 102 can performs the act 804 to filter (e.g., resample) the quantized encoded data within the frequency (e.g., DCT) domain. For example, the digital image resolution modification system 102 can apply Lanczos or another resampling technique in the frequency domain as described above.

Further, the digital image resolution modification system 102 can perform the act 806 of using sub-band approximation to generate sub-band approximated data for the digital image 204. For example, the digital image resolution modification system 102 can generate sub-band approximated data for the whole digital image 204 at once. Likewise, the digital image resolution modification system 102 can perform the act 808 to implement block composition on the entire image. Particularly, the digital image resolution modification system 102 generates composite DCT data for the digital image 204. Further still, the digital image resolution modification system 102 performs the act 810 for Huffman encoding to generate the modified digital image 206.

Figure 9:
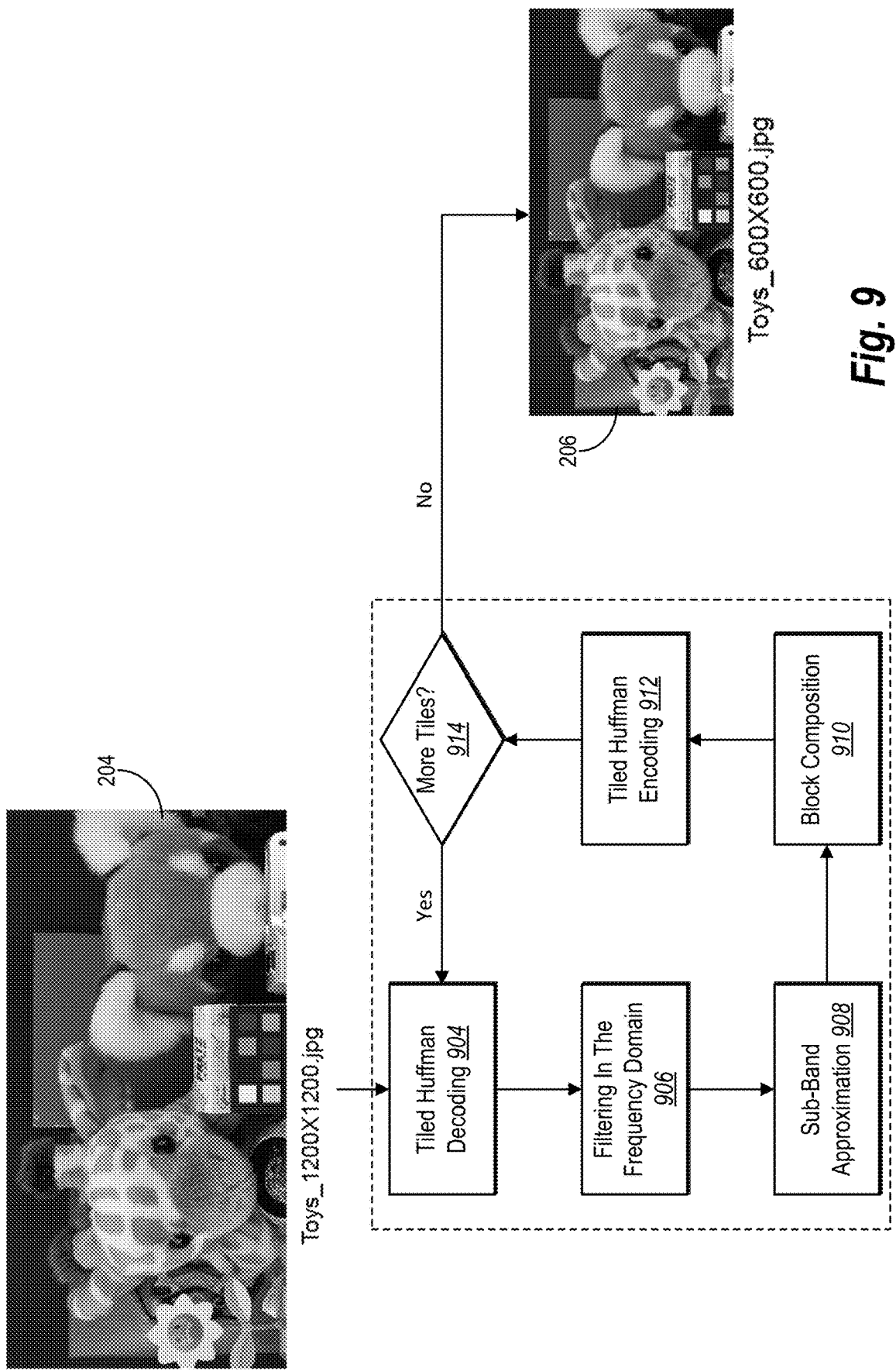
FIG. 9 illustrates an overview of a process of modifying a resolution of a digital image using tiled resampling in the frequency domain in accordance with one or more embodiments.

As mentioned, the digital image resolution modification system 102 can modify the resolution of a digital image (e.g., the digital image 204) using a tiling procedure. FIG. 9 illustrates an example process for modifying the resolution of the digital image 204 based on a tiling procedure. As shown, the digital image resolution modification system 102 performs an act 904 of tiled Huffman decoding. In particular, the digital image resolution modification system 102 decodes the digital image 204 into the frequency domain utilizing a tiled Huffman decoding process. As described above, the digital image resolution modification system 102 tiles the digital image 204 and generates DCT blocks of quantized frequency data corresponding to the tiles of the digital image 204.

In addition, the digital image resolution modification system 102 performs an act 906 of filtering (e.g., resampling) in the frequency domain. In particular, the digital image resolution modification system 102 utilizes a resampling technique to filter the quantized DCT data of the DCT blocks within the frequency domain tile by tile. As described above, the digital image resolution modification system 102 can implement a Lanczos filtering technique by applying a Lanczos resampling kernel to the DCT blocks to filter the DCT frequency data tile by tile.

Further, the digital image resolution modification system 102 can perform an act 908 of sub-band approximation. In particular, the digital image resolution modification system 102 can utilize a sub-band approximation technique to generate sub-band approximated blocks based on the filtered DCT blocks tile by tile. As described above, the digital image resolution modification system 102 can reduce the size of the DCT blocks based on a target size of the modified digital image 206 utilizing sub-band approximation.

As shown, the digital image resolution modification system 102 can perform an act 910 of block composition. In particular, the digital image resolution modification system 102 can utilize a block composition process to generate a composite DCT block based on sub-band approximated DCT blocks tile by tile. As described above, the digital image resolution modification system 102 can apply a block composition matrix to the sub-band approximated DCT blocks to generate a composite DCT block for the digital image 204.

As further shown, the digital image resolution modification system 102 can perform an act 912 of tiled Huffman encoding. In particular, the digital image resolution modification system 102 utilizes a tiled Huffman encoding method to code the composite DCT blocks. As described above, the digital image resolution modification system 102 can encode the composite DCT block utilizing a Huffman table to store the code and the table as a JPEG for display as a portion (e.g., a tile) of the modified digital image 206.

Additionally, the digital image resolution modification system 102 can perform an act 914 to determine whether there are more tiles remaining to be analyzed. In particular, the digital image resolution modification system 102 analyzes individual tiles of the digital image 204 to generate, filter, and process DCT blocks (e.g., one or more at a time). Upon determining that there are more tiles still to be encoded, filtered, and otherwise processed, the digital image resolution modification system 102 repeats the acts 904-914. Upon determining that there are no more tiles remaining to be processed, however, the digital image resolution modification system 102 completes the process and stores the coded data and the Huffman table(s) as a JPEG for display as the modified digital image 206.

While FIGS. 3-9 describe generating a two-dimensional modified digital image 206 from a two-dimensional original digital image 204, other dimensionalities are also possible. Indeed, the digital image resolution modification system 102 can implement the above-described methods and processes to compress digital images in three dimensions. In these embodiments, the digital image resolution modification system 102 utilizes equations and functions similar to those described above, but modified for application in three-dimensions.

Figure 10:
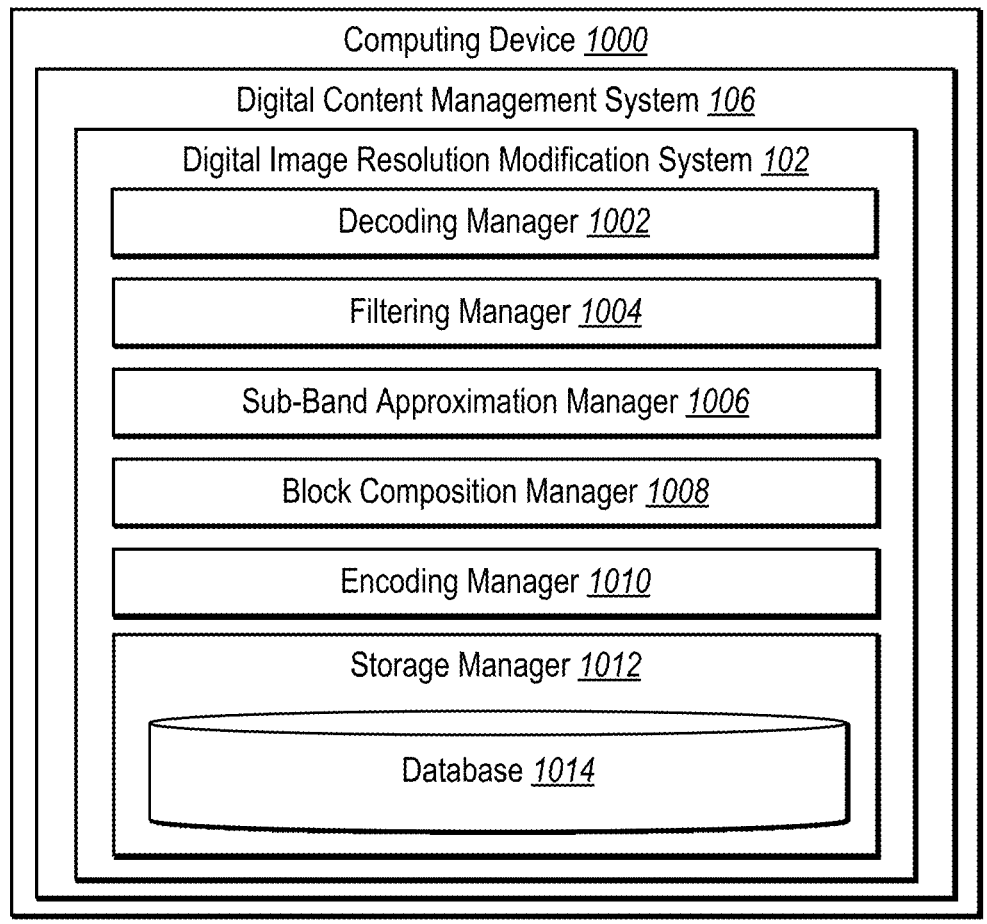
FIG. 10 illustrates a schematic diagram of a digital image resolution modification system in accordance with one or more embodiments.

Turning now to FIG. 10, additional detail will be provided regarding components and capabilities of the digital image resolution modification system 102. Specifically, FIG. 10 illustrates an example schematic diagram of the digital image resolution modification system 102 on an example computing device 1000 (e.g., one or more of the client device 110 and/or the server(s) 104). As shown in FIG. 10, the digital image resolution modification system 102 may include a decoding manager 1002, a filtering manager 1004, a sub-band approximation manager 1006, a block composition manager 1008, an encoding manager 1010, and a storage manager 1012.

As just mentioned, the digital image resolution modification system 102 includes a decoding manager 1002. In particular, the decoding manager 1002 manages, implements, applies, utilizes, executes, performs, or generates encodings (e.g., Huffman decoding) of digital image data in the frequency domain. For example, as described above, the decoding manager 1002 applies Huffman decoding to encode digital image data into frequency data in the frequency domain as described above in relation to FIG. 3. In some embodiments, the decoding manager 1002 communicates with the storage manager 1012 (e.g., that includes one or more computer memory devices) stores the frequency data within the database 1014.

In addition, the digital image resolution modification system 102 includes a filtering manager 1004. In particular, the filtering manager 1004 manages, implements, applies, utilizes, executes, performs, determines, or generates filtering of quantized DCT data (e.g., for tiled portions). For example, the filtering manager 1004 utilizes a resampling technique such as Lanczos resampling to filter the DCT data in the frequency domain by applying a Lanczos resampling kernel, as described herein. As also described, the filtering manager 1004 can alternatively (or additionally) utilize a different resampling method such as bilinear resampling and/or bicubic resampling. In some embodiments, the filtering manager 1004 communicates with the storage manager 1012 to access quantized DCT data from, and to store resampled DCT data within, the database 1014.

Further, the digital image resolution modification system 102 includes a sub-band approximation manager 1006. In particular, the sub-band approximation manager 1006 manages, implements, applies, utilizes, executes, performs, determines, or generates sub-band approximation of filtered/resampled DCT data. For example, as described, the sub-band approximation manager 1006 resizes the DCT blocks in accordance with a target size for resizing a digital image. In some embodiments, the sub-band approximation manager 1006 communicates with the storage manager 1012 to access filtered/resampled DCT data from, and to store sub-band approximated DCT blocks within, the database 1014.

As further illustrated, the digital image resolution modification system 102 includes a block composition manager 1008. In particular, the block composition manager 1008 manages, implements, applies, utilizes, executes, performs, determines, or generates block composition based on sub-band approximated DCT blocks. For example, the block composition manager 1008 utilizes a block composition matrix to generate a composite DCT block based on sub-band approximated DCT blocks, as described above. In some embodiments, the block composition manager 1008 communicates with the storage manager 1012 to access sub-band approximated DCT blocks from, and to store composite DCT blocks within, the database 1014.

As mentioned, the digital image resolution modification system 102 also includes an encoding manager 1010. In particular, the encoding manager 1010 manages, implements, applies, utilizes, executes, performs, determines, or generates Huffman encoding (e.g., tiled Huffman encoding or a different decoding method) to code the composite DCT block for generating a modified digital image. As described, the encoding manager 1010 codes composite DCT data based on a Huffman table to store the codes and the table as JPEG. Alternative encoding techniques are also possible for generating modified digital images in different formats. The encoding manager 1010 can further communicate with the storage manager 1012 to store a modified digital image within the database 1014.

In one or more embodiments, each of the components of the digital image resolution modification system 102 are in communication with one another using any suitable communication technologies. Additionally, the components of the digital image resolution modification system 102 can be in communication with one or more other devices including one or more user devices described above. It will be recognized that although the components of the digital image resolution modification system 102 are shown to be separate in FIG. 10, any of the subcomponents may be combined into fewer components, such as into a single component, or divided into more components as may serve a particular implementation. Furthermore, although the components of FIG. 10 are described in connection with the digital image resolution modification system 102, at least some of the components for performing operations in conjunction with the digital image resolution modification system 102 described herein may be implemented on other devices within the environment.

The components of the digital image resolution modification system 102 can include software, hardware, or both. For example, the components of the digital image resolution modification system 102 can include one or more instructions stored on a computer-readable storage medium and executable by processors of one or more computing devices (e.g., the computing device 1000). When executed by the one or more processors, the computer-executable instructions of the digital image resolution modification system 102 can cause the computing device 1000 to perform the methods described herein. Alternatively, the components of the digital image resolution modification system 102 can comprise hardware, such as a special purpose processing device to perform a certain function or group of functions. Additionally or alternatively, the components of the digital image resolution modification system 102 can include a combination of computer-executable instructions and hardware.

Furthermore, the components of the digital image resolution modification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital image resolution modification system 102 may be implemented as part of a stand-alone application on a personal computing device or a mobile device. Alternatively or additionally, the components of the digital image resolution modification system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, ADOBE PREMIERE, ADOBE RUSH, and ADOBE LIGHTROOM. "ADOBE," "ADOBE ILLUSTRATOR," "ADOBE PHOTOSHOP," "ADOBE PREMIERE," "ADOBE RUSH," and "ADOBE LIGHTROOM" are trademarks of Adobe Inc. in the United States and/or other countries.

FIGS. 1-10, the corresponding text, and the examples provide a number of different systems, methods, and non-transitory computer readable media for generating a modified digital image by filtering a digital image within the frequency domain using a tiling technique. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
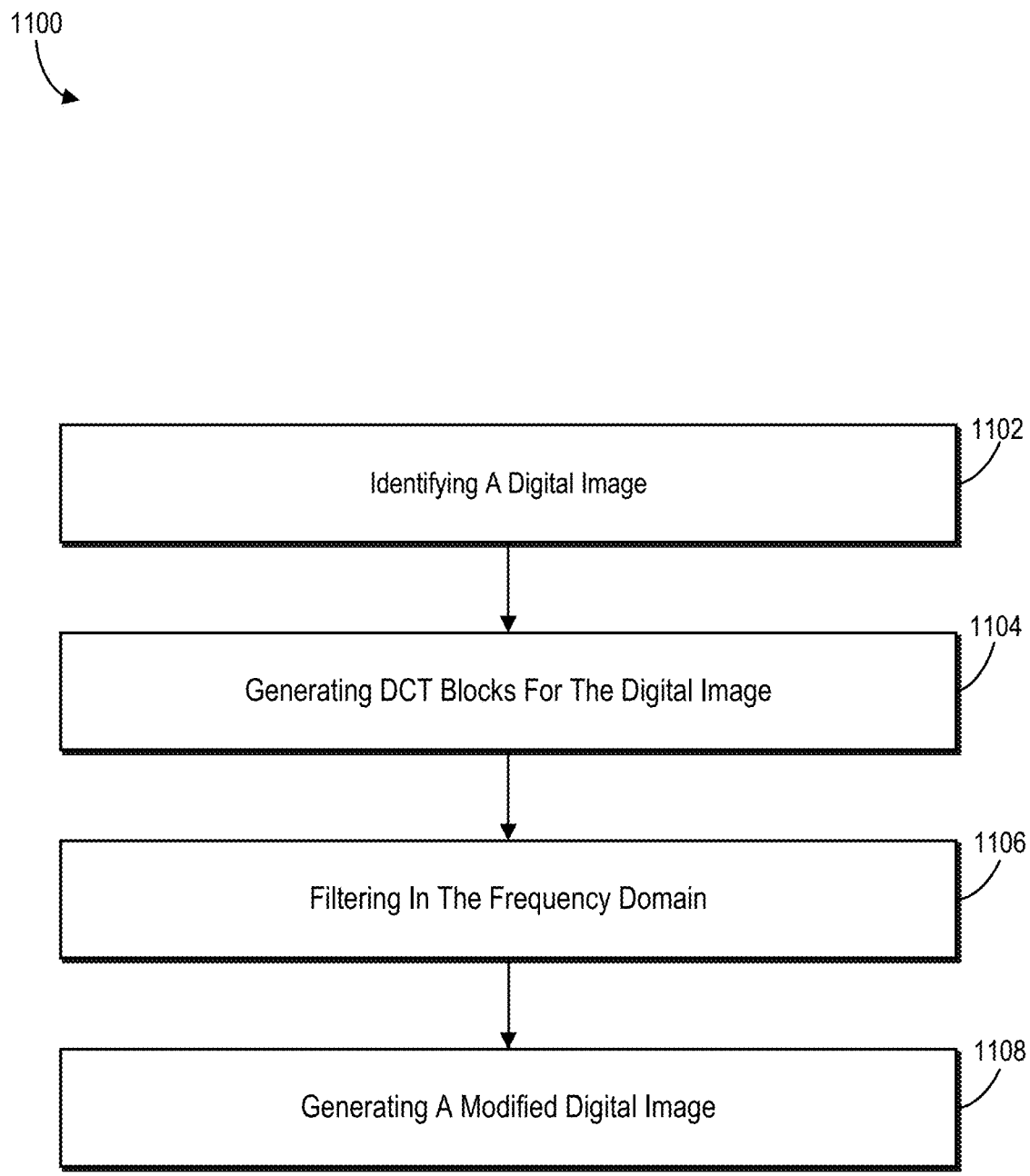
FIG. 11 illustrates a flowchart of a series of acts for generating a modified digital image based on resampling in the frequency domain in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating a modified digital image based on tiled filtering of quantized DCT data in the frequency domain. The series of acts 1100 includes an act 1102 of identifying a digital image. In particular, the act 1102 can include identifying a digital image to modify from an initial resolution to a target resolution. The digital image can include a JPEG digital image or a raw digital image including a first height and a first width.

In addition, the series of acts 1100 includes an act 1104 of generating DCT blocks for the digital image. In particular, the act 1104 can include generating discrete cosine transform blocks comprising frequency data representing the digital image. For example, the act 1104 can involve encoding the digital image into discrete cosine transform blocks comprising frequency data, wherein the discrete cosine transform blocks correspond to tiled portions of the digital image. In some embodiments, the act 1104 can include utilizing Huffman decoding to generate the DCT blocks comprising the frequency data representing the digital image. In other embodiments, the act 1104 can include applying a discrete cosine transform to the raw digital image to generate the discrete cosine transform blocks comprising the frequency data representing the digital image. The act 1104 can involve encoding the digital image into discrete cosine transform blocks by utilizing a Huffman decoding technique. In some embodiments, the act 1104 can involve encoding the digital image into a frequency domain by generating, for corresponding portions of the digital image, discrete cosine transform blocks comprising frequency data.

As shown, the series of acts 1100 includes an act 1106 of filtering the frequency domain. In particular, the act 1106 can include resampling the frequency data of the discrete cosine transform blocks. In some embodiments, the act 1104 involves filtering the frequency data of the digital image by applying a resampling kernel to the discrete cosine transform blocks. The act 1106 can involve utilizing Lanczos resampling, a bilinear resampling, or a bicubic resampling. For example, the act 1106 can involve resampling the frequency data of the DCT blocks by applying a horizontal resampling kernel (e.g., on a first pass) to change a horizontal resolution of the digital image. The act 1106 can also (or alternatively involve) filtering the frequency data by further applying a vertical resampling kernel (e.g., on a second pass) to change a vertical resolution of the digital image. The resampling kernel can include a Lanczos resampling kernel, a bilinear resampling kernel, or a bicubic resampling kernel. In some embodiments, the act 1106 can involve filtering the frequency data of the digital image by applying a Lanczos resampling kernel to the discrete cosine transform blocks. In these or other embodiments, the act 1106 can involve resampling the frequency data by resampling tiles of the frequency data in series.

Further, the series of acts 1100 includes an act 1108 of generating a modified digital image. A modified digital image can include a compressed digital image. In particular, the act 1106 can include generating, based on the filtered frequency data, a modified digital image of the target resolution. The act 1108 can involve generating the modified digital image of the target resolution by encoding the merged discrete cosine transform blocks utilizing Huffman encoding. For example, the act 1108 can involve utilizing Huffman encoding to generate the modified digital image based on the merging of adjacent modified discrete cosine transform blocks utilizing the block composition matrix. In some embodiments, the act 1108 can involve generating, based on the sub-band approximation of the filtered frequency data, a modified digital image of the target resolution. The act 1108 can be accomplished in real time where generating the modified digital image is performed in real time in response to a request for the digital image at the target resolution. The modified digital image can include a JPEG digital image with a second height smaller than the first height and a second width smaller than the first width.

The series of acts 1100 can include an act of reducing the size of the filtered frequency data by utilizing sub-band approximation to generate modified discrete cosine transform blocks comprising dimensions that are smaller than dimensions of the discrete cosine transform blocks. Utilizing sub-band approximation can include reducing the size of the filtered frequency data by utilizing sub-band approximation based on the target resolution for modifying the resolution of the digital image. Additionally, the series of acts 1100 can include an act of merging adjacent modified discrete cosine transform blocks utilizing a block composition matrix.

Further, the series of acts 1100 can include an act of refraining from storing multiple resolutions of the digital image within a digital image database. Further still, the series of acts 1100 can include an act of receiving, via a graphical user interface element, user input to generate the modified digital image from the digital image. The series of acts 1100 can also (or alternatively) include an act of generating the modified digital image is accomplished in real time based on the user input. In some embodiments, the series of acts 1100 includes an act of generating tiles of discrete cosine transform blocks and an act of recursively filtering, reducing, and encoding the tiles of discrete cosine transform blocks until all the tiles of discrete cosine transform blocks have been processed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
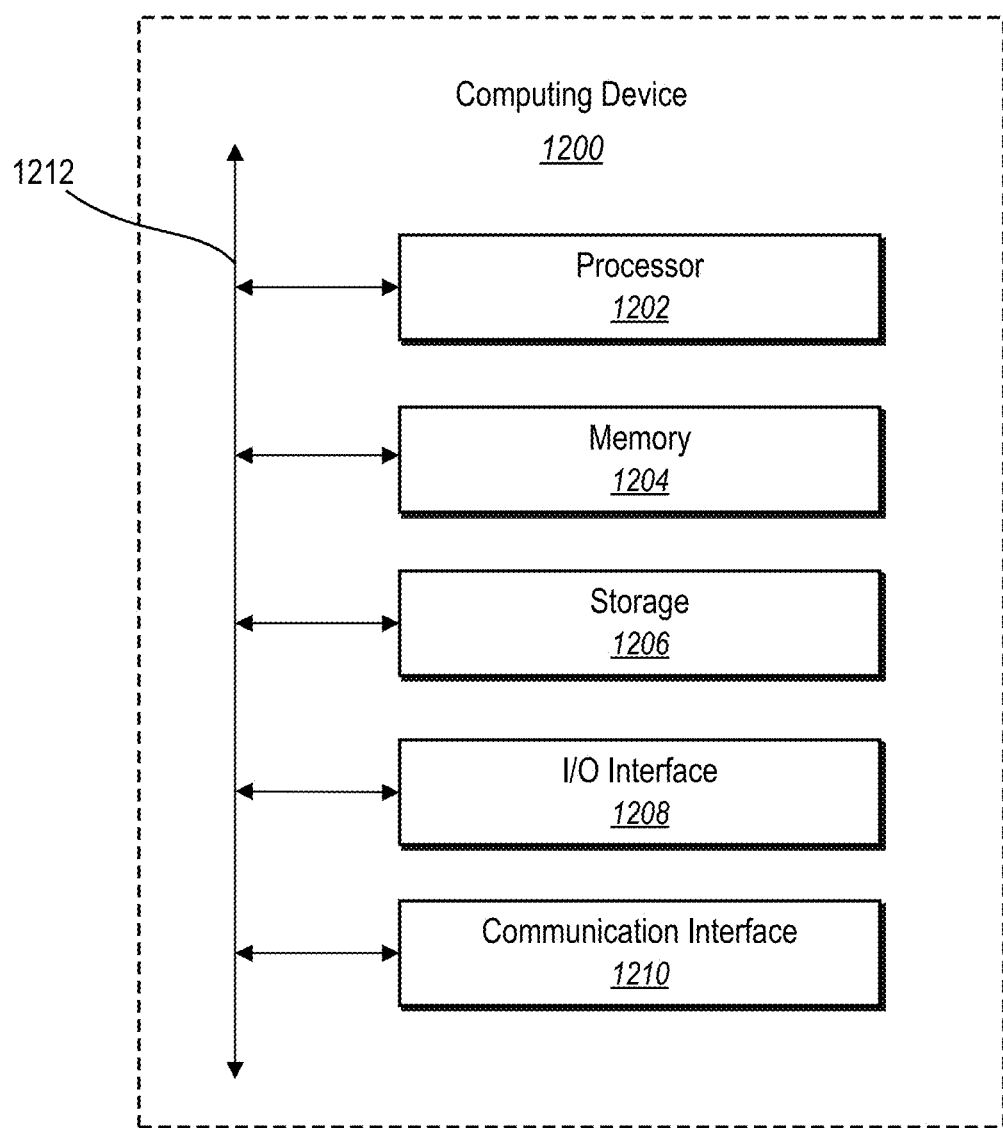
FIG. 12 illustrates a block diagram of an example computing device in accordance with one or more embodiments.

FIG. 12 illustrates, in block diagram form, an example computing device 1200 (e.g., the computing device 1000, the client device 110, and/or the server(s) 104) that may be configured to perform one or more of the processes described above. One will appreciate that the digital image resolution modification system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
   identify a digital image to modify from an initial resolution to a target resolution smaller than the initial resolution;
   generate, from the digital image at the initial resolution, discrete cosine transform blocks comprising frequency data representing respective portions of the digital image;
   filter the frequency data of the discrete cosine transform blocks from the digital image at the initial resolution; and
   generate, from the filtered frequency data, a modified digital image of the target resolution.

2. The non-transitory computer readable medium of claim 1, wherein the instructions, when executed by the at least one processor, cause the computer device to filter the frequency data of the discrete cosine transform blocks utilizing Lanczos resampling, a bilinear resampling, or a bicubic resampling.

3. The non-transitory computer readable medium of claim 1, wherein the instructions, when executed by the at least one processor, cause the computer device to filter the frequency data of the discrete cosine transform blocks by applying a horizontal resampling kernel to change a horizontal resolution of the digital image.

4. The non-transitory computer readable medium of claim 3, wherein the instructions, when executed by the at least one processor, cause the computer device to filter the frequency data of the discrete cosine transform blocks by applying a vertical resampling kernel to change a vertical resolution of the digital image.

5. The non-transitory computer readable medium of claim 1, wherein:
   the modified digital image comprises a compressed digital image; and
   the instructions, when executed by the at least one processor, cause the computer device to generate the discrete cosine transform blocks comprising the frequency data representing the digital image utilizing Huffman decoding.

6. The non-transitory computer readable medium of claim 1, wherein:
   the digital image comprises a raw digital image; and
   the instructions, when executed by the at least one processor, cause the computer device to generate the discrete cosine transform blocks comprising the frequency data representing the digital image by applying a discrete cosine transform to the raw digital image.

7. The non-transitory computer readable medium of claim 1, further comprising instructions that, when executed by the at least one processor, cause the computer device to reduce the size of the filtered frequency data utilizing sub-band approximation to generate modified discrete cosine transform blocks comprising dimensions that are smaller than dimensions of the discrete cosine transform blocks.

8. The non-transitory computer readable medium of claim 7, further comprising instructions that, when executed by the at least one processor, cause the computer device to merge modified discrete cosine transform blocks utilizing a block composition matrix.

9. The non-transitory computer readable medium of claim 8, further comprising instructions that, when executed by the at least one processor, cause the computer device to generate the modified digital image of the target resolution by encoding the merged discrete cosine transform blocks utilizing Huffman encoding.

10. The non-transitory computer readable medium of claim 1, wherein the instructions, when executed by the at least one processor, cause the computer device to filter the frequency data by resampling tiles of the frequency data in series.

11. A system comprising:
    one or more memory devices comprising digital images; and
    one or more server devices that cause the system to:
       identify a digital image for modifying from an initial resolution to a target resolution smaller than the initial resolution;
       generate, at the initial resolution, discrete cosine transform blocks comprising frequency data representing respective portions of the digital image;
       filter, in a frequency domain, the frequency data of the discrete cosine transform blocks from the digital image at the initial resolution by applying a resampling kernel to the discrete cosine transform blocks;
       reduce the size of the resampled discrete cosine transform blocks utilizing sub-band approximation to generate modified discrete cosine transform blocks corresponding to the target resolution; and
       generate a modified digital image of the target resolution by encoding the modified discrete cosine transform blocks.

12. The system of claim 11, wherein the one or more server devices cause the system to generate the discrete cosine transform blocks utilizing a Huffman decoding technique.

13. The system of claim 12, wherein the one or more server devices further cause the system to merge adjacent modified discrete cosine transform blocks utilizing a block composition matrix.

14. The system of claim 13, wherein the one or more server devices cause the system to generate the modified digital image of the target size by encoding merged discrete cosine transform blocks utilizing Huffman encoding.

15. The system of claim 11, wherein the one or more server devices further cause the system to refrain from storing multiple resolutions of the digital image.

16. The system of claim 11, wherein the one or more server devices cause the system to:
    generate tiles of discrete cosine transform blocks, and
    recursively filter, reduce, and encode the tiles of discrete cosine transform blocks until all the tiles of discrete cosine transform blocks have been processed.

17. A method comprising:
    identifying a digital image to modify from an initial resolution to a target resolution smaller than the initial resolution;

generating, from the digital image at the initial resolution, discrete cosine transform blocks comprising frequency data representing respective portions of the digital image;

filtering the frequency data of the discrete cosine transform blocks from the digital image at the initial resolution; and generating, from the filtered frequency data, a modified digital image of the target resolution.

18. The method of claim 17, wherein generating the modified digital image is performed in real time in response to a request for the digital image at the target resolution.

19. The method of claim 17, further comprising reducing the size of the frequency data utilizing sub-band approximation to generate modified discrete cosine transform blocks.

20. The method of claim 19, further comprising merging adjacent modified discrete cosine transform blocks utilizing a block composition matrix.

* * * * *